(12) United States Patent
Nutahara et al.

(10) Patent No.: US 7,509,287 B2
(45) Date of Patent: Mar. 24, 2009

(54) BANK ACCOUNT AUTOMATIC ADJUSTMENT SYSTEM

(76) Inventors: Atsuo Nutahara, 21-12, Takasuhigashimachi, Kochi-shi, Kochi, 781-8105 (JP); Masakazu Wakita, 3-33, Okayamahigashi 5-chome, Shijonawate-shi, Osaka 575-0003 (JP)

( * ) Notice: Subject to any disclaimer, the term of this patent is extended or adjusted under 35 U.S.C. 154(b) by 1138 days.

(21) Appl. No.: 10/478,109

(22) PCT Filed: May 21, 2002

(86) PCT No.: PCT/JP02/04923

§ 371 (c)(1),
(2), (4) Date: Nov. 19, 2003

(87) PCT Pub. No.: WO02/095642

PCT Pub. Date: Nov. 28, 2002

(65) Prior Publication Data
US 2004/0177036 A1    Sep. 9, 2004

(30) Foreign Application Priority Data
May 25, 2001   (JP) .............................. 2001-153561

(51) Int. Cl.
*G06Q 40/00* (2006.01)
(52) U.S. Cl. .......................................... 705/39; 705/53
(58) Field of Classification Search ............. 705/10–44, 705/53
See application file for complete search history.

(56) References Cited

U.S. PATENT DOCUMENTS 4,839,804 A * 6/1989 Roberts et al. ............ 705/36 R 5,631,821 A   5/1997 Hagan
5,631,828 A   5/1997 Hagan
6,097,834 A * 8/2000 Krouse et al. ................ 382/137
7,181,430 B1 * 2/2007 Buchanan et al. ............. 705/45

FOREIGN PATENT DOCUMENTS

JP     07-282161 A    10/1995
JP     10-200273 A     1/2000
WO    WO 02/25534 A2   3/2002

* cited by examiner

*Primary Examiner*—Frantzy Poinvil
(74) *Attorney, Agent, or Firm*—Foley & Lardner LLP

(57) ABSTRACT

The present system for automatically adjusting deposit balance is the effective measure for pay-off which calculates the excess amount by subtracting from the balance of the account established in one financial institution, the specified balance for the account and calculates the allowable amount by subtracting from the specified balance for the account established in other financial institution, the balance of the account and compares said excess amount with said allowable amount and sets the transfer amounts as the one lesser of either said excess amount or said allowable amount. Specifically the system for automatically adjusting deposit sets in addition the plus specified balance for checking and savings accounts and time deposit account respectively when said accounts include checking account and savings account and time deposit accounts. The system for automatically adjusting deposit further sets the minus specified balance for the debt amount. Preferably the system for automatically adjusting deposit is an apparatus which enables to maintain the necessary balance and calculates the deficit amount by subtracting from the balance for the account established in one financial institution, the necessary balance for the account and calculates the surplus amount by subtracting from the necessary balance for the account established in said other financial institution, the balance for the account and compares said deficit amount with the surplus amount and sets the amount that is lesser of said deficit or surplus amounts for the transfer amount.

60 Claims, 19 Drawing Sheets

FIG.17

| Order | Payment day | Total amounts of payment |
|---|---|---|
| 1 | July 31,2002 Tuesday | ¥6,586,992 |
| 2 | May 1, 2001 Tuesday | ¥2,984,543 |
| 3 | April 2, 2001 Monday | ¥2,567,898 |
| 4 | October 1, 2001 Monday | ¥2,483,411 |
| 5 | April 1, 2002 Monday | ¥1,234,523 |

FIG.18

| Contents of payment | Payment amounts | Temporary |
|---|---|---|
| Accounts payable in June | ¥2,786,992 | |
| Warehouse charge in August | ¥ 200,000 | |
| Charge for repairing leak in the roof of office building | ¥3,600,000 | Temporary |
| Total | ¥6,586,992 | |

FIG.19

| Order | Payment day | Total amount of payment |
|---|---|---|
| 1 | July 31,2002 Tuesday | ¥2,986,992 |
| 2 | May 1,2001 Tuesday | ¥2,984,543 |
| 3 | April 2,2001 Monday | ¥2,567,898 |
| 4 | October 1,2001 Monday | ¥2,483,411 |
| 5 | April 1, 2002 Monday | ¥1,234,523 |

BANK ACCOUNT AUTOMATIC ADJUSTMENT SYSTEM

TECHNICAL FIELD

This invention relates to the system and method for automatically adjusting deposit balance and in more detail the system and method for automatically adjusting deposit balance which automatically transfers some of deposits between two or more deposit accounts established in two or more financial institutions respectively for the depositor.

BACKGROUND ART

So-called payoff (measures by which the principal 10,000,000 yen and the interest of the time deposit etc. shall be the amount of proof for paying back when the financial institution such as the bank etc. does the management failure) was lifted in Japan on Apr. 1, 2002. Also in other countries, some have already lifted a ban as for payoff and some others are scheduled to lift a ban. After lifting payoff, the depositor should take necessary measures always observing the deposit balance so that the total amount of money should not exceed 10,000,000 yen.

On the other hand, because various amounts of money are automatically charged and withdrawn from the deposit account, the depositor should be increasing the deposit balance of his account in advance of such charge to the account. Therefore, the depositor going to the bank etc. deposits necessary amount of money by operating the ATM (automatic teller machine) or transferring it from other deposit accounts at the day of charge or the previous day of it.

However, this kind of work is heavy burden for the depositor. Recently, with spreading of so-called Internet banking system, it has become possible to transfer money by operating PC (personal computer) at home or by using the cellular phone, etc. however it has unchanged that it is still required for the depositor to confirm the deposit balance and to do transfer operation.

The bank system which makes a prescribed amount of money automatically transfer by using the computer is open to the public on Aug. 29, 1984 (the public disclosure TOKU-KAI SHO59-151259). This system is put to practical use as "Swing service", and is the one to transfer the excess amount of money automatically to the deposit account whose priority level is lower than it when the balance of a certain deposit account exceeds prescribed amount of the upper bound, where the priority level is put on two or more deposit accounts. According to this system a higher balance can be maintained at the deposit account with a higher interest rate, however it cannot deal with the above mentioned payoff nor a necessary balance be secured automatically in advance of direct charge to the account.

DISCLOSURE OF INVENTION

One object of this invention is to provide the system and its method for automatically adjusting the deposit balance which is effective for countermeasure to the payoff.

Another object of this invention is to provide the system and its method automatically adjusting deposit balance which enables to secure the necessary balance.

The system for automatically adjusting deposit balance and its method of the present invention is the system in which the adjustment system automatically transfers some of deposits between two or more accounts established in two or more financial institutions respectively for a certain depositor and provides means for comparing the balance in a certain account established in one of plural financial institutions with the specified balance in the account and transferring means to transfer the excess amount from the account established in one financial institution to the account established in another financial institution in case that the balance of the account established in one financial institution exceeds the specified amount for the account. Therefore, when the balance exceeds the specified balance, the balance is distributed to the account(s) of the other financial institution(s).

Preferably, the system for automatically adjusting deposit balance further provides means for calculating excess amounts by subtracting the specified balance of the account from the balance of the account established in one financial institution, means for calculating allowable amounts by subtracting the balance of the account from the specified balance in the account of established in the other financial institution, means for comparing excess amounts with allowable amounts and means for setting the transferable amount transferred by transferring means the lesser of excess amounts and allowable amounts. Therefore, after the transfer, the final balance shall not exceed the specified balance in the account.

Preferably, the above account shall include floating deposit account. Further the present system for automatically adjusting deposit balance provides specified balance setting means for setting specified balance to the floating deposit account. Further preferably, floating deposit accounts have the first and second accounts. The specified balance setting means sets the first specified balance for the first account and sets the second specified balance for the second account. Hence, each account of plural (one or more) accounts can have individual specified balance fitted for respective account.

The system for automatically adjusting deposit balance of present invention is the system in which the adjustment system automatically transfers some of deposits between two or more accounts established in two or more financial institutions respectively for a certain depositor and provides means for comparing the balance in a certain account established in one of plural financial institutions with the necessary balance in the account and transferring(or transfer) means to transfer a certain amount of money to said account established in said one financial institution from an account established in the other financial institution in case that the balance of the account established in said one financial institution becomes less than the necessary balance in that account. Therefore, in case that the balance becomes less than the necessary balance, the balance will be made up with money from the other account in the other financial institution.

Still further, it is preferable that the present system for automatically adjusting a deposit balance provides means for calculating the deficit amount by subtracting the necessary balance of the account from the balance of the account established in one financial institution, means for calculating the surplus amount by subtracting the balance of the account from necessary balance for the account established in the other financial institution, means for comparing the deficit amount with the surplus amount and means for setting the amount to be transferred by transferring means the lesser of the above deficit amount and the surplus amount. Hence, the final balance shall not become less than the necessary balance even after the transfer.

Preferably, the above account shall include floating deposit account. The system for automatically adjusting deposit balance, further provides necessary balance setting means for setting necessary balance to the floating (current) deposit account. Further preferably, floating accounts include the first and second accounts. Necessary balance setting means sets the first necessary balance for the first account and sets the second necessary balance for the second account. Hence, each account can have individual necessary balance fitted for respective floating account among plural floating account.

Still further, the system for automatically adjusting deposit balance preferably provides means for selecting one of plural (two or more) accounts in accordance with predetermined priority level. Transfer means transfers money from the selected accounts. Alternately the system for automatically adjusting deposit balance further provides means for selecting one of plural accounts according to predetermined priority level. Transfer means transfers money to the selected account. As a result it is possible to maximize as much as possible the balance of the important account dealing with many transactions and to minimize as little as possible the balance of relatively unimportant accounts dealing with lesser transactions.

"Financial institution" used in the specification contains not to mention a bank, a credit union (Shinyou Kinko), a credit association (Shinyou Kumiai), worker's credit unions (Roudou Kinnko), a credit union central safe (Shinkin Chuoukinnko), a National credit cooperative union federation (Zenkoku Shinyoukyoudou Kumiai Rengoukai), a worker's credit unions federation (Roudou kinko Rengoukai), a agricultural cooperative association (Nougyou Kyoudou Kumiai), a fishery cooperative union (Gyogyou Kyoudou Kumiai), and a fishery processing cooperative society (Suisan Kakou Kyoudou Kumiai) and Post office etc.

Moreover, the term "the deposit insurance system" contains not only the insurance system for deposit protection under the Deposit Insurance Law in Japan but also contains the insurance system for deposit protection of agricultural and fishery cooperative credit union (Nousuisangyou Kyoudou Kumiai Chokinhoken seido) and any Deposit Insurance System maintained by Federal Deposit Insurance Corporation(FDIC) in the United State, by Deposit Protection Bureau (DPB) in Britain, by French Bank Association(AFB) in French. Also it shall contain those which are substantially the same as above-mentioned deposit insurance system, even if the name be changed in the future.

Moreover, the term "insurance deposit"(or "insured deposit")(Fufo Yokin) means all financial instruments which are the objects of insurance under the deposit insurance system and savings, the fixed amount (teigaku) deposit certificate, and the mail transfer account system operated by the post offices which are substantially protected by the government.

Moreover, the term "floating deposit" (or "liquidity deposit") means a financial instrument such as a checking account (or current deposit) (Touza Yokin), a personal checking account (Touza Chokin), a ordinary deposit (savings account) (Futsu yokin) and a ordinary postal deposit (Futsu chokin), savings of a mail transfer account and the like which usually saves money, and is free to make a deposit or draw out.

"Non-floating deposit" means financial instruments other than the floating deposit and typically means the fixed deposit such as time deposit etc. including a regular reserve fund (Teiki tsumitatekin) etc.

BRIEF DESCRIPTION OF DRAWINGS

FIG. 17 is a picture on the screen displayed at S113 in FIG. 16A.

FIG. 18 is picture on the screen displayed at S115 in FIG. 16A.

FIG. 19 is a picture on the screen displayed at S118 in FIG. 16A.

BEST MODE FOR CARRYING OUT THE INVENTION

Figure 1:
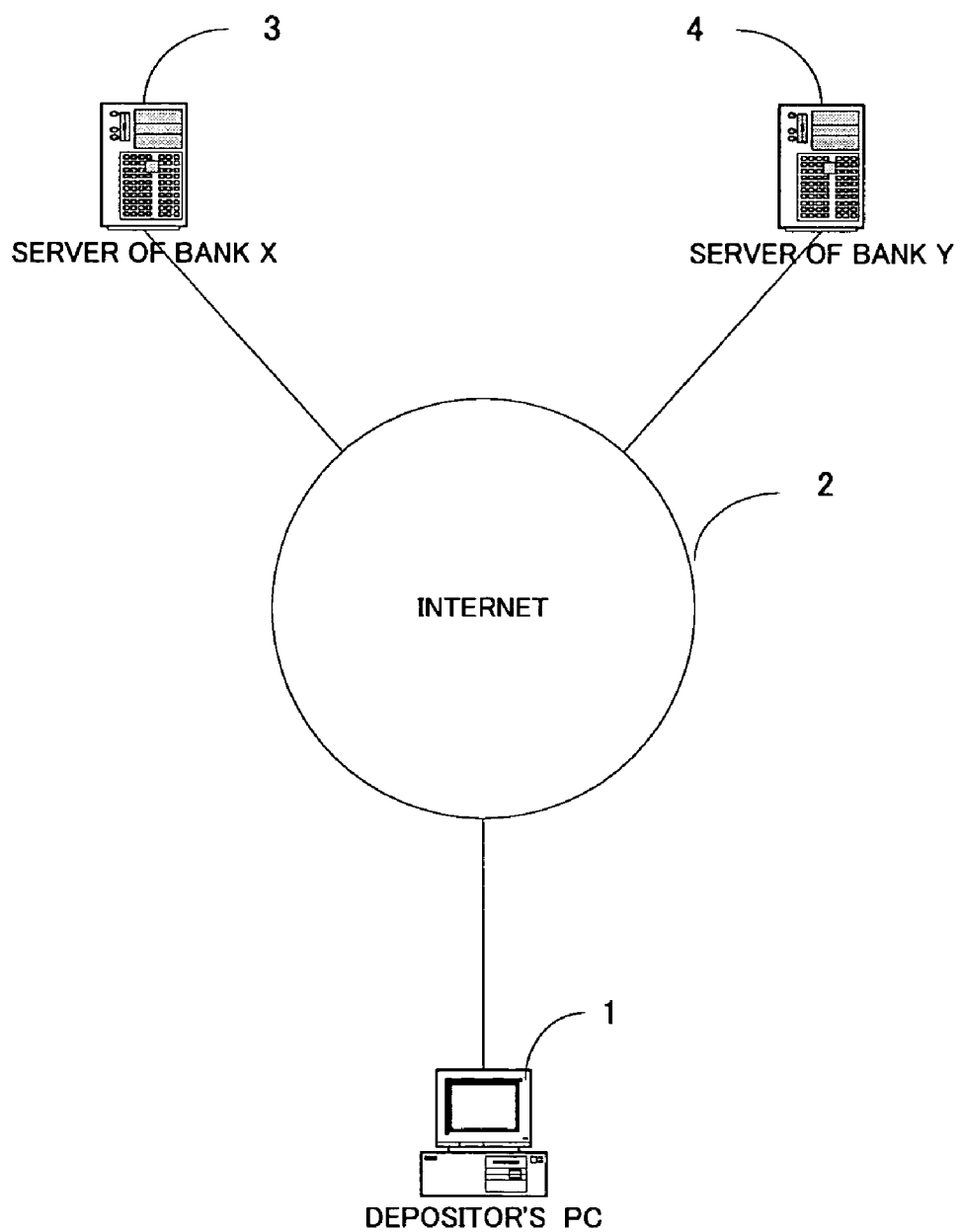
FIG. 1 is a block diagram which shows the outline of entire computer network system which contains the system for automatically adjusting deposit balance deposit balance in the form of embodiment of the present invention.

Hereafter, explained is the embodiments of present invention in detail referring to the drawings. The identical sign is assigned to the same or equivalent part in the drawing and no explanation is repeated. Here, embodiments are shown as examples based on the deposit insurance system in Japan. It is assumed that it can counterbalance the debt of the loan etc. with the deposit at that time etc., should the cause be occurred as defined under in Article 49 clause 2 of Deposit Insurance Law in Japan. In the following embodiment, explanation has been made assuming that the limited amount of the insurance in the deposit insurance system is 10,000,000 yen, although such limited amount varies depend on countries or regions.

1. Preferable Embodiment of Present Invention

Now referring to FIG. 1, depositor's PC 1 is connected with the server computer 3 and 4 (hereafter merely referred to "Server") through Internet 2. In FIG. 1, server 3 of bank X and server 4 of bank Y are illustrated by way of example.

Figure 2:
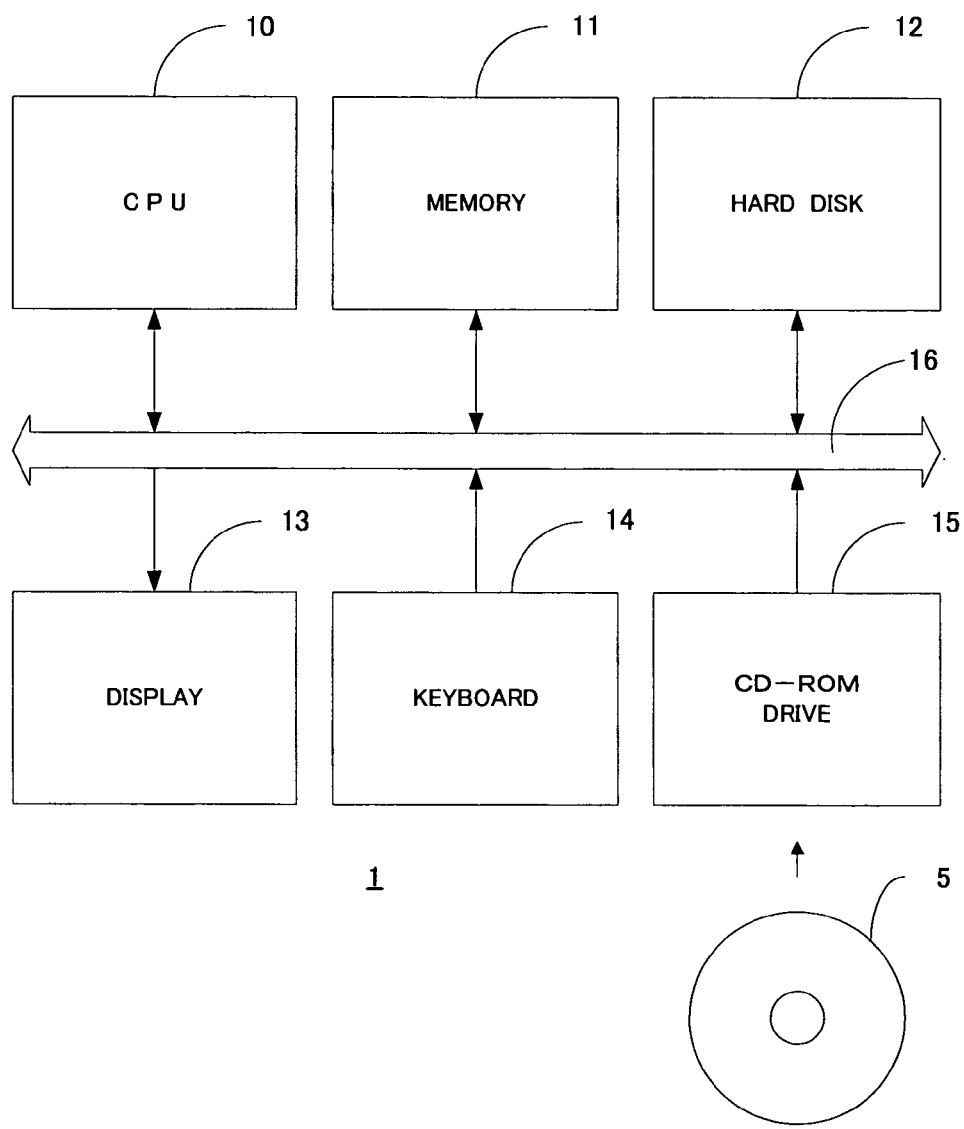
FIG. 2 is a block diagram which discloses the construction of PC1 in FIG. 1.

In reference to FIG. 2, Depositor's PC1 has CPU 10(Central Processing Unit), memory 11 such as ROM (read-only memory) and RAM (random-access memory), hard disk 12, displays 13, keyboards 14, CD-ROM (compact disc read-only memory) drives 15 and bus 16 mutually connecting aforementioned devices.

The program (product) for automatically adjusting deposit balance described hereinafter is stored in CD-ROM 5 which is one of computer readable media. When CD-ROM5 is slotted into drive 15, the program for automatically adjusting deposit balance is installed in PC 1. As a result, the program for automatically adjusting deposit balance makes the PC 1 execute specified balance transfer processing and the necessary balance transfer processing and makes PC 1 possible to function as a system for automatically adjusting deposit balance as mentioned hereinafter. These processing are explained hereinafter.

1.1. Specified Balance Transfer Processing

Figure 3:
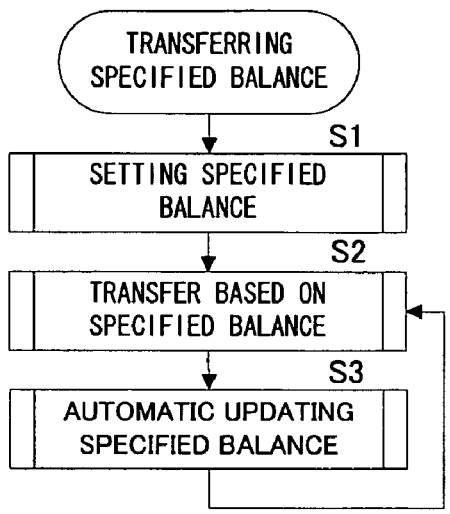
FIG. 3 is a flow chart which shows the specified balance transfer processing in the system for automatically adjusting deposit balance in the form of the embodiment of this invention.

Referring to FIG. 3, the present system and method for automatically adjusting deposit balance firstly sets a specified balance (S1) and continuously transfers money based on a specified balance(S2) and finally updates the a specified balance automatically(S3). These steps are explained hereinafter.

1.1.1. Specified Balance Setting (S 1)

The system for automatically adjusting deposit balance sets a specified balance of bank X as shown in Table 1 by way of example. (henceforth blank)

In succession the system for automatically adjusting deposit balance sets the minus specified balances for the loan to the same amount with the one of the balance of the loan (S102). In the example shown in Table 1, because the balance of the loan is 6,000,000 yen, the minus specified balance for the loan is set to 6,000,000 yen.

Continuously the depositor operating the keyboard inputs the preferred plus specified balance for the checking account (Sl03). In the example shown in Table 1, 5,000,000 yen is input as a plus specified balance for the checking deposit account.

Finally, the system for automatically adjusting deposit balance adds the minus specified balances for the loan to 10,000,000 yen and subtracts from the total sum the total amounts of the plus specified balance for the checking account and the plus specified balance for the time deposit account and calculates the plus specified balance for the ordinary deposit (savings) account (S104). In the example shown in Table 1, the plus specified balance for the ordinary deposit account is set to 3,000,000 yen.

In short, each specified balance is set so that the result of subtracting the minus specified balances from the total amounts of the plus specified balance may become 10,000,000 yen.

The system for automatically adjusting deposit balance sets the initial specified balance of bank Y as shown in Table 1. The explanation is not repeated because the concrete operation is basically the same as is mentioned above.

TABLE 1

Example of Process transferring specified balance

| Bank | Account | Plus Specified balance | Minus Specified balance | *1 | *2 | Balance | Post-Transfer 1 | Post-Transfer 2 |
|---|---|---|---|---|---|---|---|---|
| Bank X | Check | ¥5,000,000 | — | 1 | 3 | ¥4,614,112 | ¥4,994,112 | ¥4,994,112 |
| (Main | Ordinary | ¥3,000,000 | — | 2 | 2 | ¥5,983,214 | ¥5,603,214 | ¥2,993,214 |
| Bank) | Time | ¥8,000,000 | — | | | ¥8,000,000 | ¥8,000,000 | ¥8,000,000 |
| | Loan | — | ¥6,000,000 | | | ¥6,000,000 | ¥6,000,000 | ¥6,000,000 |
| | Total | ¥16,000,000 | ¥6,000,000 | | | ¥12,597,326 | ¥12,597,326 | ¥9,987,326 |
| Bank Y | Check | ¥0 | — | | | | | |
| (Sub | Ordinary | ¥10,000,000 | — | 3 | 1 | ¥0 | ¥0 | ¥2,610,000 |
| Bank) | Time | ¥0 | — | | | | | |
| | Loan | — | ¥0 | | | | | |
| | Total | ¥10,000,000 | ¥0 | | | ¥0 | ¥0 | ¥2,610,000 |

*1: Priority of designated Bank Ades
*2: Priority of source Bank Asou

The specified balance includes the plus specified balance and the minus specified balances. Generally the plus specified balance has "Positive" balance and is set for check, ordinary and time deposit accounts. The minus specified balances are set for the loan (loan from the bank) which has the balance of "Negative".

Figure 4:
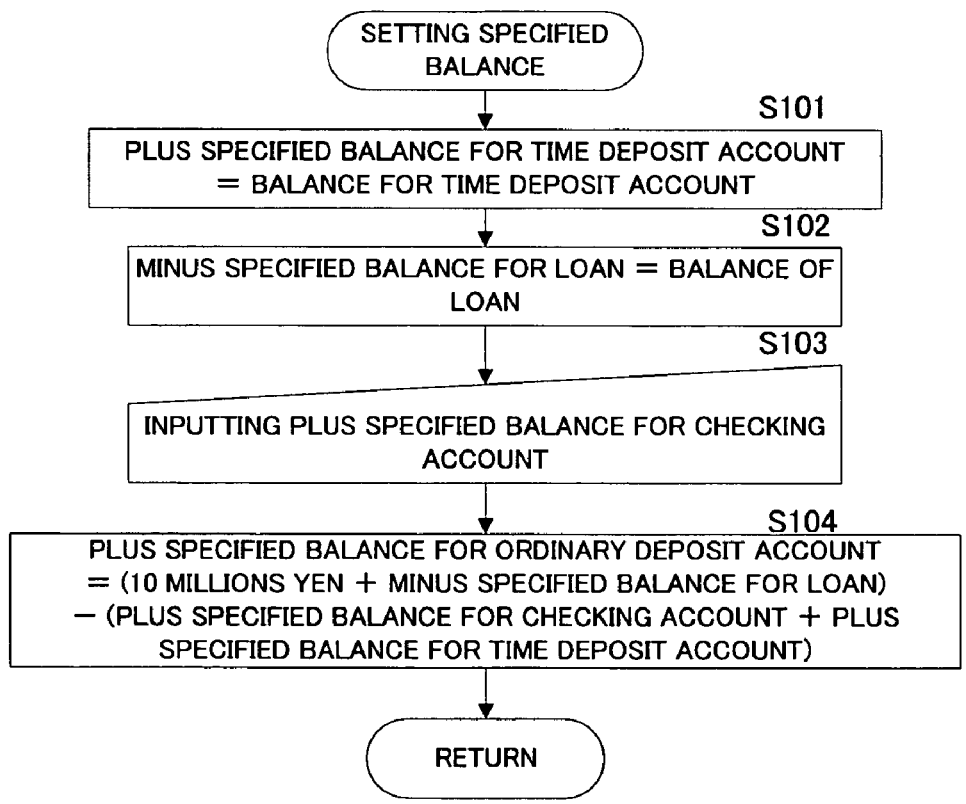
FIG. 4 is a flow chart which shows the specified balance setting processing in FIG. 3.

In more detail, referring to FIG. 4, the system for automatically adjusting deposit balance sets first of all the plus specified balance for the time deposit account to the same amount with the one of the balance for the time deposit account (S101). In the example shown in Table 1, because the balance of the time deposit account is 8,000,000 yen, the plus specified balance for the time deposit account is set to 8,000,000 yen.

1.1.2. Transfer Based on Specified Balance (S 2)

Next, the system for automatically adjusting deposit balance transfers money based on the set plus specified balance. In order to transfer money, the source account, the designated account and the amount of money should be decided in advance. In the example shown in Table 1, assuming bank X as main bank and bank Y as sub-bank, and account priority level Ades for designated account and priority level Asou for source account are set respectively to each deposit account. Usually priority level for the source account Asou is set in reverse order as to the one for the designated account Ades.

Figure 5A:
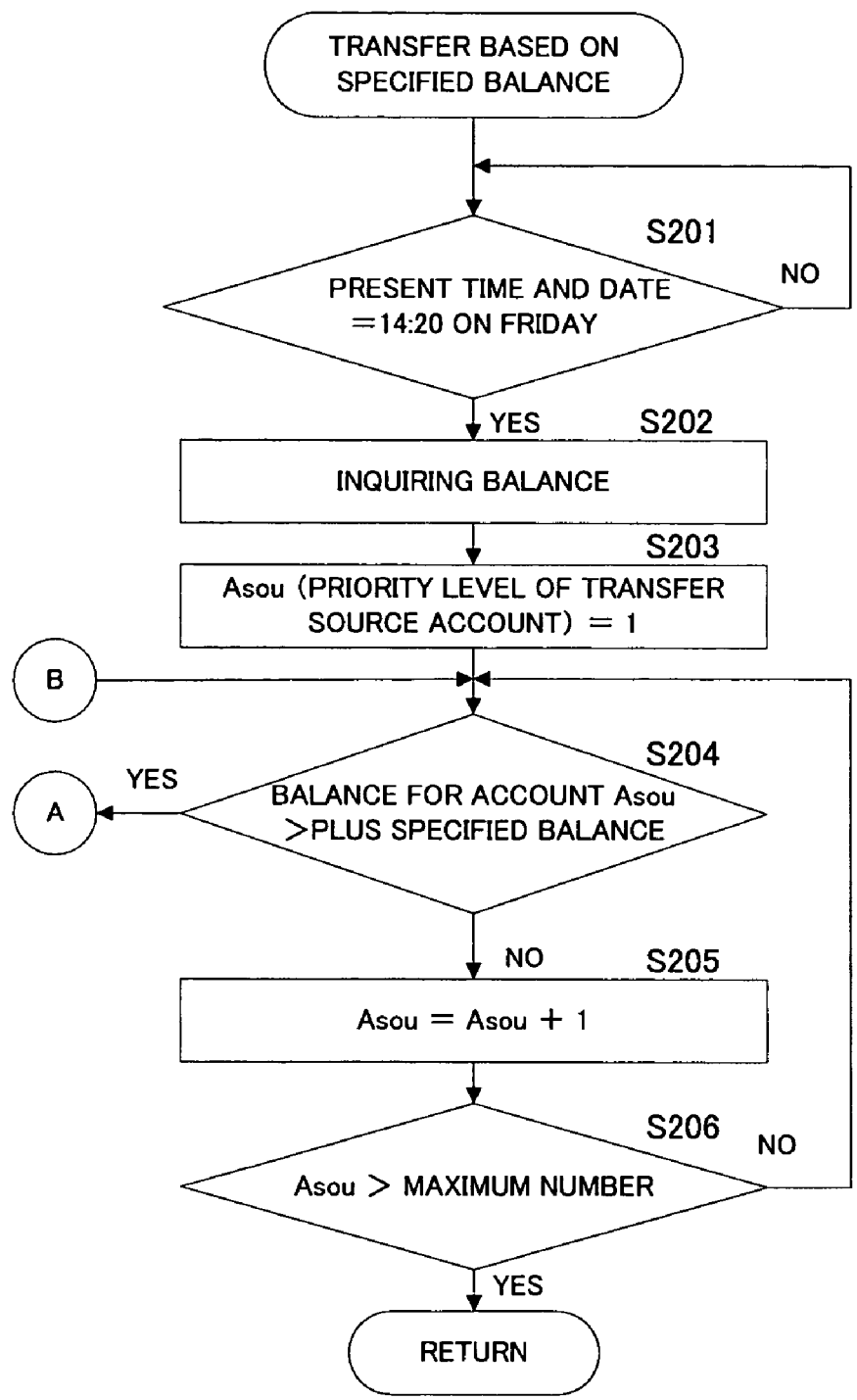
FIGS. 5A and 5B are flow charts in which the transfer processing based on a specified balance in FIG. 3 is disclosed.
Figure 5B:
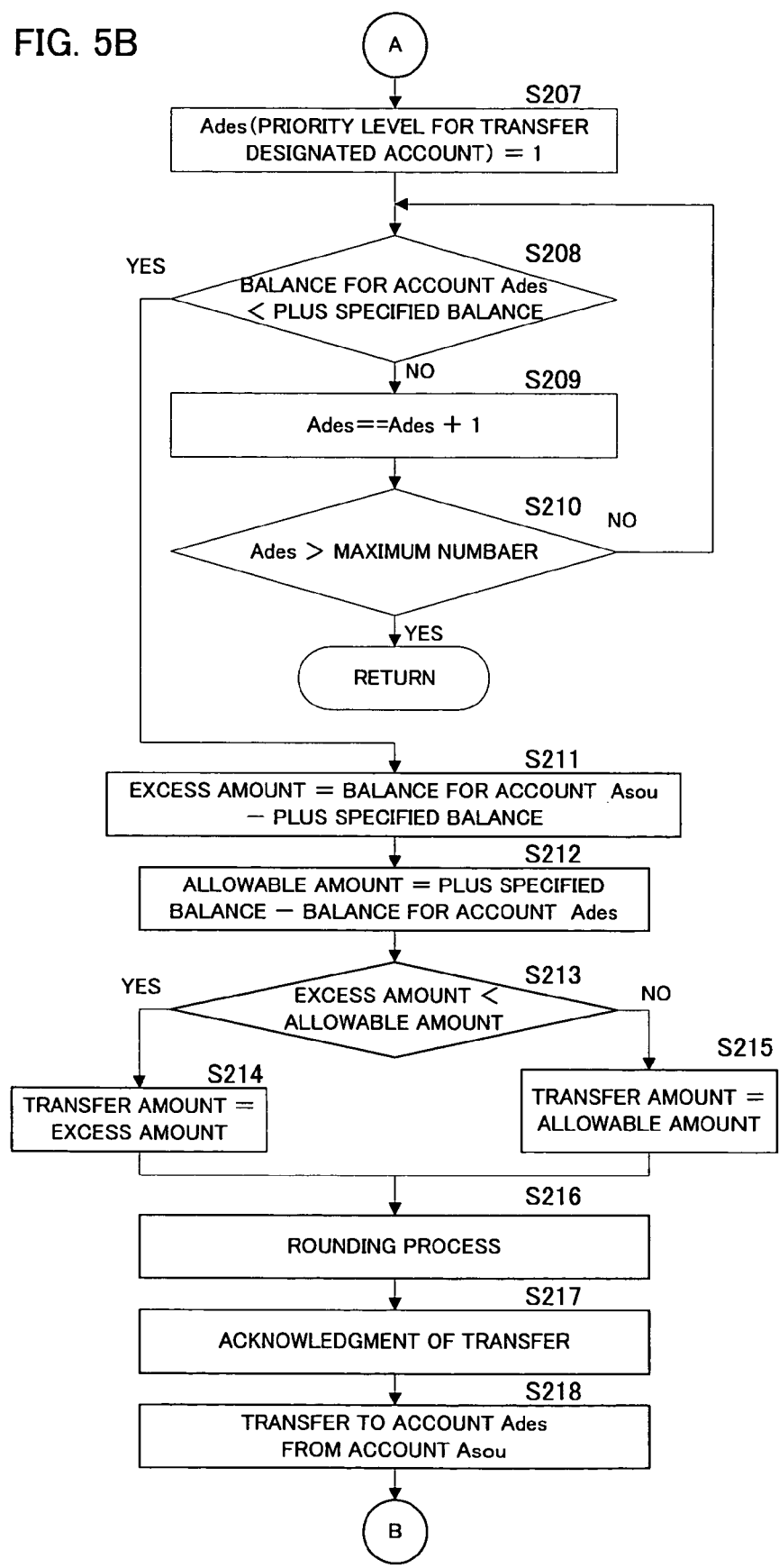

Referring to FIGS. 5A and 5B, the system for automatically adjusting deposit balance decides whether the present date and time is at 14:20 on Friday (S201) or not. Since announcement of management failure in a certain bank generally be made at 15 o'clock on Friday, the present embodiment set the time little earlier than that time considering of time necessary for processing the transfer operation in this example.

At the time of 14:20 on Friday, the system for automatically adjusting deposit balance accesses to server 3 of bank X and server 4 of bank Y, and inquires the balance of each deposit account (S202). In this example, the balance shown in Table 1 is inquired. At this time, the total balance at Bank X when the loan of bank X is subtracted from total deposit amounts (Hereafter, it is said, "Balanced total balance"), is 12,597,326 yen, which exceeds 10,000,000 yen.

Then the system for automatically adjusting deposit balance seeks transfer source account(s) which balance exceeds its plus specified balance according to transfer source account priority level Asou (S203-S206). Concrete operation is as follows.

First of all, the system for automatically adjusting deposit balance sets transfer source account priority level Asou to "1" (S203). In this example, the ordinary deposit account of bank Y is selected as a transfer source account.

The system for automatically adjusting deposit balance continuously judges whether the balance of the selected transfer source account exceeds the plus specified balance or not (S204). If it is exceeded, it advances to S207 to retrieve the designated deposit account to transfer money.

On the other hand, if it is not exceeded, the system for automatically adjusting deposit balance makes increment to the priority level of transfer source account Asou (S205).

And, the system for automatically adjusting deposit balance judges whether priority level of transfer source account Asou exceeds maximum number (in the present case it is 3) or not(S206) and it ends the transfer processing when it is exceeded and it returns to S204 when it is not exceeded.

In the example shown in Table 1, Asou becomes 2 because the balance of the ordinary deposit account of bank Y with Asou=1 is 0 yen. The balance of the ordinary deposit account of bank X with Asou=2 is 5,983,214 yen and exceeds its plus specified balance 3,000,000 yen. Therefore, the ordinary deposit account of bank X is selected at first as a transfer source account.

Next, the system for automatically adjusting deposit balance retrieves designated accounts according to priority level of designated account Ades whose present balance is less than the plus specified balance (S207-S210). Concrete operation is as follows.

First of all, the system for automatically adjusting deposit balance sets the priority level of designated account Ades to "1" (S207). The checking account of bank X is selected as an designated transfer account in the example shown in Table 1.

In succession the system for automatically adjusting deposit balance judges whether the balance of the selected and designated transfer account is less than its plus specified balance or not (S208). In case that the system judges it less, it advances to S211 to decide the amount of money to be transferred.

On the other hand, when it is not less, the system for automatically adjusting deposit balance adds increments to the account priority level Ades of the transfer designated account (S209).

And the system for automatically adjusting deposit balance judges whether account priority level Ades of the transfer designated account exceeded the maximum number (It is 3 in the example as shown in Table 1) or not (S210) and terminates transfer-process based on the designated balance in case of excess and returns to S208 in case of non-excess.

The checking account of bank X is selected first as an transfer designated account in the example shown in Table 1, since the balance for the checking account of bank X with Ades=1 is 4,614,112 yen and does not exceed the 5,000,000 yen of the plus specified balance.

Next, the system for automatically adjusting deposit balance subtracts the plus specified balance from the balance of the selected transfer source account and calculates the excess amount (S211). In the example shown in Table 1, the balanced amount of 5,983,214 yen in the ordinary deposit account of bank X is subtracted by the plus specified balance of 3,000,000 yen to result in the excess amount 2,983,214 yen.

The system for automatically adjusting deposit balance continuously subtracts the balance of the account from the plus specified balance for the selected transfer designated account and calculates the allowable deposit amount (S212). In the example as shown in Table 1, the allowable deposit amount of 385,888 yen is calculated by subtracting 4,614,112 yen in the balance of the account from 5,000,000 yen in the plus specified balance for the checking account of bank X.

Then the system for automatically adjusting deposit balance compares the calculated excess amount with allowable amount (S213) and determines the excess amount as transfer amount in case that the excess amount resulted less and determines allowable amount as transfer amount in case the allowable amount resulted less (S215). That is, the system [and method] for automatically adjusting deposit balance sets the lesser of the excess amount and the allowable amount as the transfer amount. In the example shown in Table 1, the transfer amount is set in the amount of 385,888 yen, since the allowable amount in checking account of bank X 385,888 yen is lesser than the excess amount of ordinary deposit account of bank X 2,983,214 yen.

The system for automatically adjusting deposit balance continuously rounds the fraction of the amount of money of the transfer. In the example shown in Table 1, the fraction of less than 10,000 yen of money of the transfer amount 385,888 yen is rounded down, and the amount of money of the transfer becomes 380,000 yen.

Continuously the system for automatically adjusting deposit balance displays this amount of money for the transfer on display 13, and requests the depositor approval to transfer money (S217). When the depositor approves the transfer, the system for automatically adjusting deposit balance sends the instruction to server 3 or 4 of the bank where a transfer source account is maintained to transfer the decided amount of money for the transfer to the designated account from the transfer source account (S218). In the example as shown in Table 1, 380,000 yen is transferred from the ordinary deposit account of bank X to the checking account of the same bank.

Upon finishing the transfer, returning to S204, the above-mentioned process is repeated until no deposit account exists in which the balance exceeds a specified balance.

In the example shown in Table 1, the amounts of 5,603,214 yen in the balance of ordinary deposit account of bank X still exceeds 3,000,000 yen of the plus specified balance even after transferring the above-mentioned, the ordinary deposit account of bank X is selected again as a transfer source account (S204). In succession, selected is the ordinary deposit account of bank Y as the designated account in which balance at present is 0 yen and does not exceed 10,000,000 yen of the plus specified balance (S207-S210). Since the excess amount of ordinary deposit account in bank X, 2,603,214 yen is fewer than the allowable amount of ordinary deposit account in bank Y, 10,000,000 yen (=10,000,000 yen −0 yen), the transfer amount of money is set to 2,603,214 yen (S211-S215) in the next step. Here, the fraction of less than 10,000 yen of the transfer amount of money 2,603,214 yen is rounded up, and the transfer amount of money becomes 2,610,000 yen. And after approval by the depositor, 2,610,000 yen is transferred from the ordinary deposit account of bank X to the ordinary deposit account of bank Y. As a result, the balance of all checking and ordinary deposit accounts shall be within a plus specified balance or less as shown in Table 1 and the balanced total balance of bank X becomes 9,987,326 yen which falls within 10,000,000 yen.

As mentioned above, in accordance with the transfer process based on the specified balance, the balanced total amount of money can be suppressed less than 10,000,000 yen without forcing the troublesome work to the depositor, because transferring money from one bank to another bank is automatically processed when the balance total amount of money of a certain bank exceeds 10,000,000 yen.

Moreover, because the plus specified balance is set respectively for a floating deposit account such as checking or ordinary deposit account, etc., a suitable plus specified balance can be set for each account.

Moreover, the balance in the transfer designated account does not exceed the plus specified balance in the account, since the lesser amount of the excess amount or allowable deposit amount is determined as the amount to be transfer.

Further, the transfer operation is not done frequently without necessity when the transfer amount of money is fewer than the transfer commission and the like, owing to rounding up process.

Further, it makes possible that deposits may gather in a more important account which is important in dealings and may not gather in an account which is not so important in transactions, because the system retrieves the accounts of a transfer source accounts and the transfer designated accounts according to the priority level.

Further, even if the bank was bankruptcy, the depositor is not suffered from any damage that the deposit is not reimbursed because the balance is inquired at the previous prescribed date and time (14:20 on Friday in the above-mentioned example) which is little earlier than the date and time when the bank might fail, and it has distributed the amount of excess to other banks.

Figure 6:
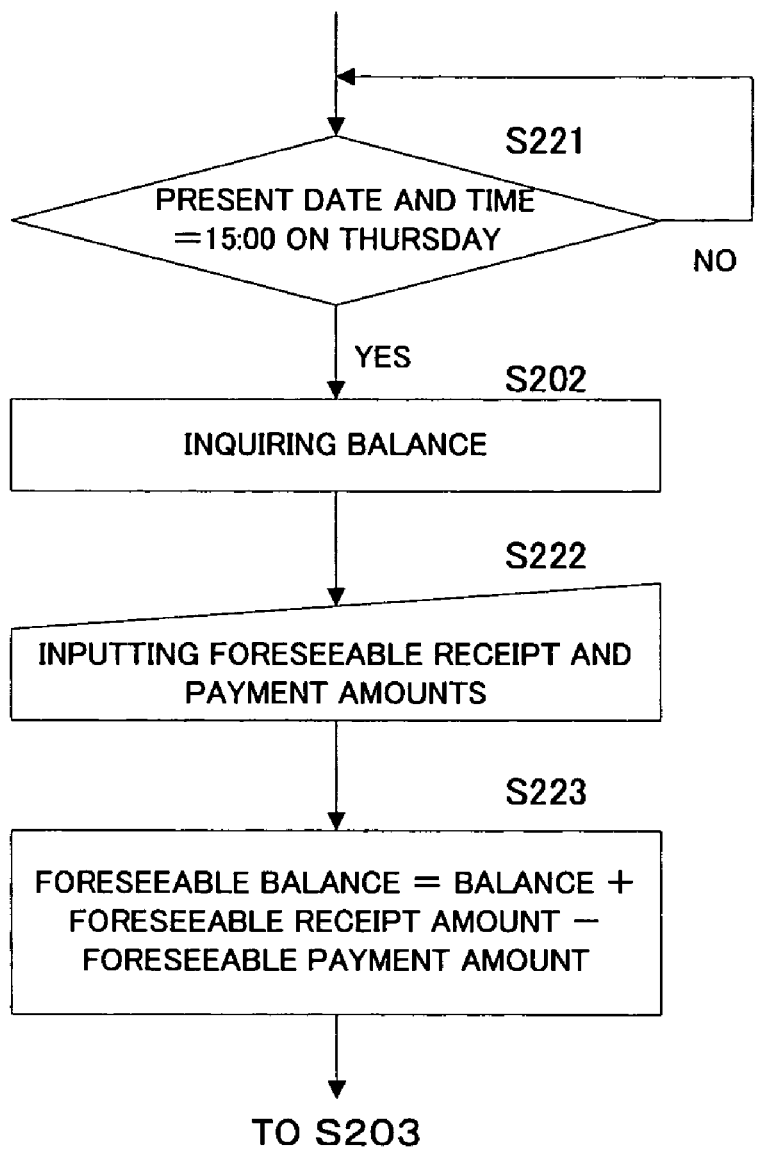
FIG. 6 is a flow chart of other embodiment of the balance inquiry processing as shown in FIG. 5A.

However, there is a possibility left that all the transfer processing cannot be completed even if the balance is inquired ahead a little like this, too. Then, the process inquiring the balance in accounts may be made before one day (15 o'clock on Thursday in this example) before the date when a bank might fail as shown in FIG. 6 (S221, S202). In this case, it is desirable to consider the accounting transaction of receipt and payment which will be dealt with in the day. For the reasons above, the depositor inputs the amount of the foreseeable receipt and payment for transactions (S222) after making inquiries on accounts, then the system for automatically adjusting deposit balance adds or subtracts forecasted amounts for transaction in the account to or from the existing balance and as a result, calculates estimated balance (S223).

1.1.3. Automatic Updating of Specified Balance (S3)

Figure 7A:
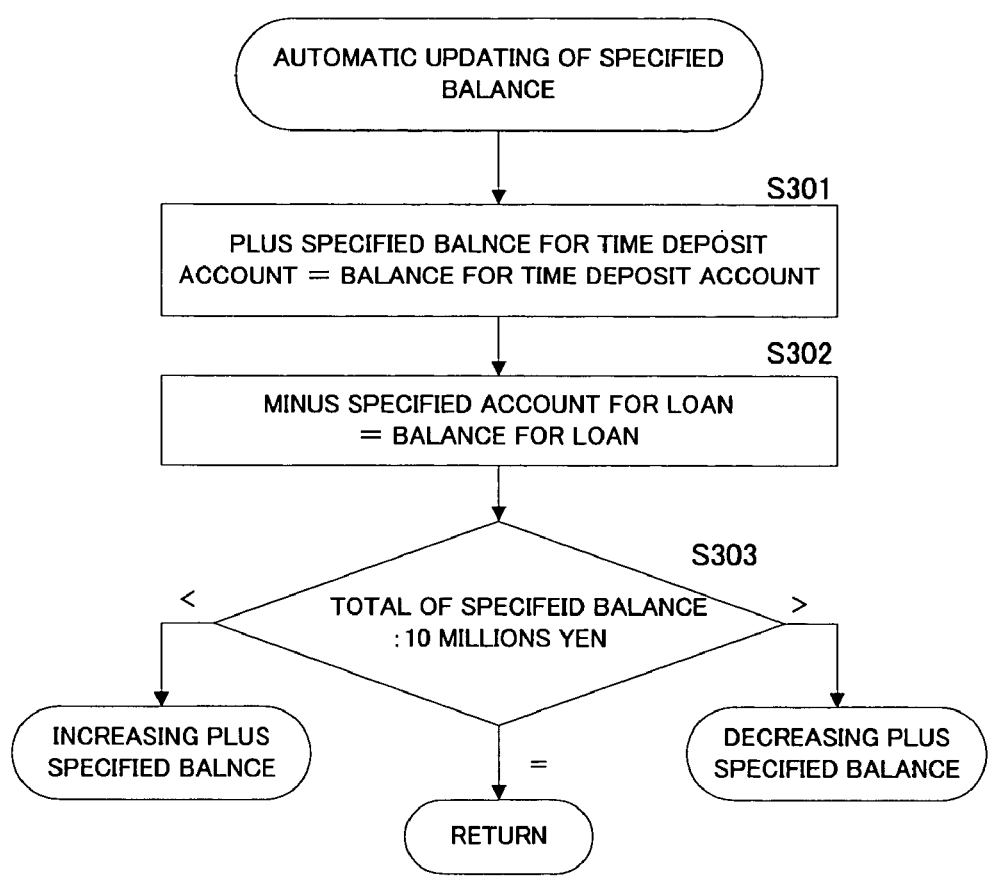
FIGS. 7A to FIG. 7C shows a flow chart where the specified balance automatic update processing in FIG. 3 is disclosed.

Referring to FIG. 7A, firstly the system for automatically adjusting deposit balance automatically sets the plus specified balance for the time deposit account to the same amount in balance of the time deposit account (S301). If the balance of the time deposit account has changed, the plus specified balance for the time deposit account is automatically set to the same amount as the new balance.

Then, the system for automatically adjusting deposit balance automatically sets the minus specified balances for the loan to the same amount in balance of the loan (S302). If the balance of the loan has changed, the minus specified balances for the loan is automatically set to the same amount as the new loan balance.

The system for automatically adjusting deposit balance calculates the total of all specified balances (=the plus specified balance for the checking account+the plus specified balance for the ordinary deposit account+the plus specified balance for the time deposit account−the minus specified balances for the loan) and compares this result with 10,000,000 yen (S303).

With decrease in the amount of time deposit or increase in the amount of loan, the total amounts of specified balances becomes less than 10,000,000 yen and it is possible to increase the plus specified balance for the floating deposit account. On the other hand, when the amounts of balance for time deposit increases or when the amounts of loan decreases, the total of a specified balances becomes more than 10,000,000 yen and the plus specified balance for the floating deposit account should be decreased. However, the plus specified balance for the floating deposit account need not be changed, in case that no changes have happened in the amounts of both time deposit or loan and eventually the total amounts of specified balance be kept 10,000,000 yen and unchanged.

It is necessary to decide automatically how much amount of money to increase or to decrease the plus specified balance for the checking account and also how much to increase or to decrease the plus specified balance for the ordinary deposit account in order to increase or to decrease the plus specified balance for the floating deposit account automatically.

Hereafter, two methods for automatically updating the plus specified balance for the checking and the ordinary deposit accounts are illustrated by way of example.

(1) Method for Setting the Limiting Amount on One to One Basis

The plus specified balance limit amount in the form of the table as shown in Table 2 is made in advance and is stored on hard disk 12. In the present method, the maximum limit amount and the minimum limit amount is individually set forth as the plus specified balance for a certain account.

TABLE 2

Plus specified balance limit amount table

| Account | Priority level for increasing amount $A_{inc}$ | Amount of the plus specified balance maximum limit | Priority level for decreasing amount $A_{dec}$ | Amount of the plus specified balance Minimum limit |
|---|---|---|---|---|
| Checking account | 1 | 6,000,000 | 2 | 0 |
| Ordinary deposit | 2 | ∞ | 1 | 0 |

In the example as illustrated in Table 2, in order to increase the plus specified balance, the priority level for increasing amount $A_{inc}$ is set so that the plus specified balance for the checking account should be firstly increased and then the plus specified balance for the ordinary deposit account be increased next. Oppositely, when the plus specified balance should be decreased, priority level for decreasing amount $A_{dec}$ is set to decrease the plus specified balance for the ordinary deposit account first and then to decrease the plus specified balance for the checking account next.

Figure 7B:
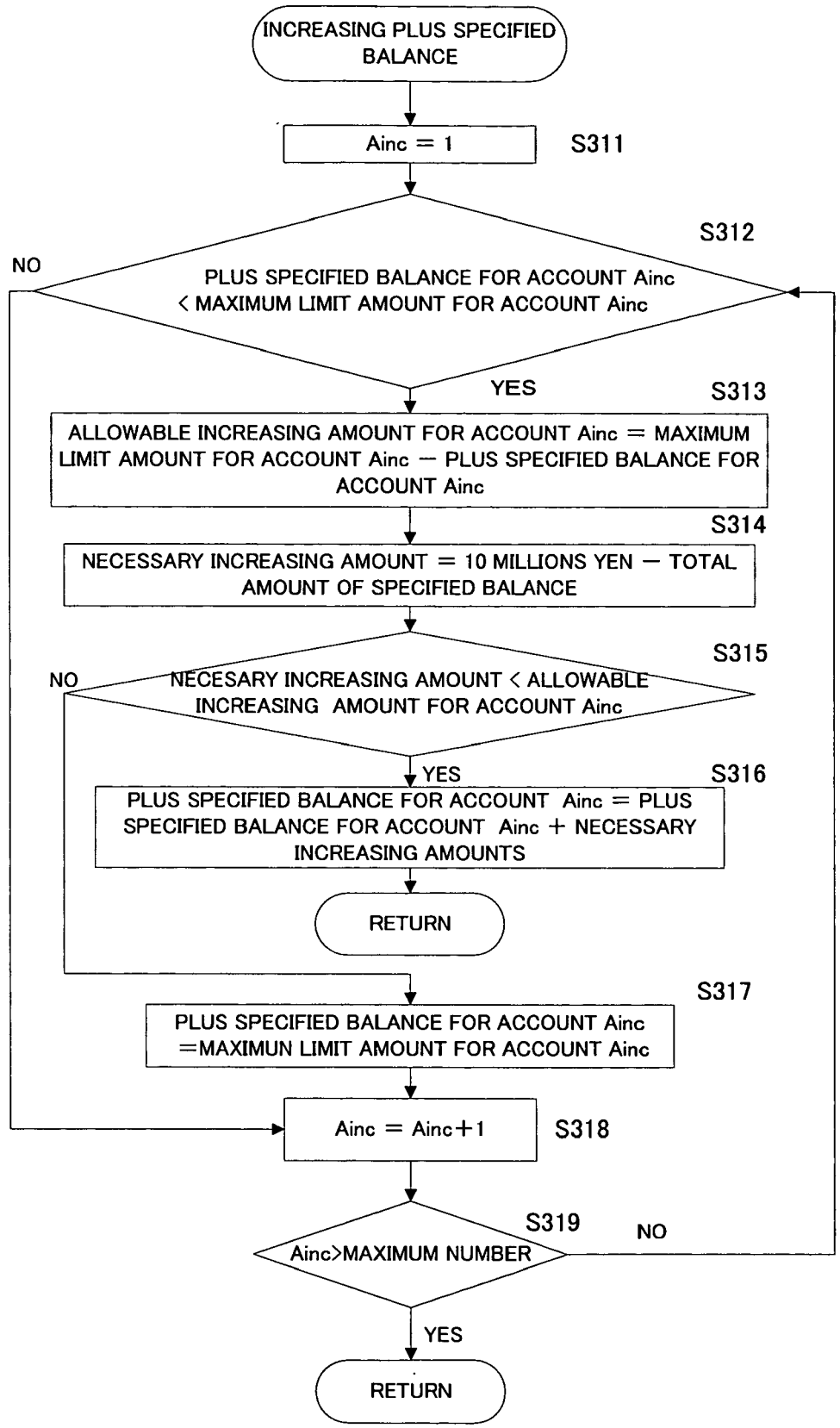

First of all, explained is the case where the plus specified balance is increased by this method. Referring to FIG. 7B, when the plus specified balance should be increased, the system for automatically adjusting deposit balance sets priority level for increasing amount Ainc to "1" (S311).

Then, the system for automatically adjusting deposit balance distinguishes whether the plus specified balance for the deposit account of Ainc is less than maximum limit amount or not (S312) referring to the plus specified balance limit amount table in Table 2. The system advances to step S313 to increase the plus specified balance for the deposit account of Ainc when the plus specified balance is less than maximum limit amount. On the other hand, it proceeds to step S318 to move to the deposit account of the following priority level when the plus specified balance is more than maximum limit amount.

When the plus specified balance is less than amount of the maximum limit, the system for automatically adjusting deposit balance subtracts the plus specified balance from the amount of the maximum limit and calculates the allowable increasing amount (S313). The system for automatically adjusting deposit balance continuously subtracts the total amounts of the plus specified balances from 10,000,000 yen and calculates a necessary increasing amount (S314).

Next, the system for automatically adjusting deposit balance distinguishes whether the necessary increasing amount is within the allowable increasing amount or not (S315). The system for automatically adjusting deposit balance adds the necessary increasing amounts to the plus specified balance and calculates a new plus specified balance in case that the necessary increasing amount falls within the allowable increasing amount (S316). In this case, the processing shall end because the plus specified balance has been increased by the necessity. On the other hand, when necessary increasing amount exceeds the allowable increasing amount, the system for automatically adjusting deposit balance sets the plus specified balance to the maximum limit amount (S317). In this case, it proceeds to step S318 to move to the deposit account of the following priority level because it has not increased by necessity, though the plus specified balance is increased up to possible permissible amount.

When the plus specified balance exceeds the maximum limit amount in step S312 or after increasing the plus specified balance up to the amount of the maximum limit amount in step S317, the system for automatically adjusting deposit balance adds increments to priority level for increasing amount Ainc (S318).

Continuously the system for automatically adjusting deposit balance distinguishes whether the priority level for increasing amount Ainc exceeds its maximum number(in the example it is "2") or not, and ceases its processing when it is exceeding and returns to step S312 when it is not exceeding.

Figure 7C:
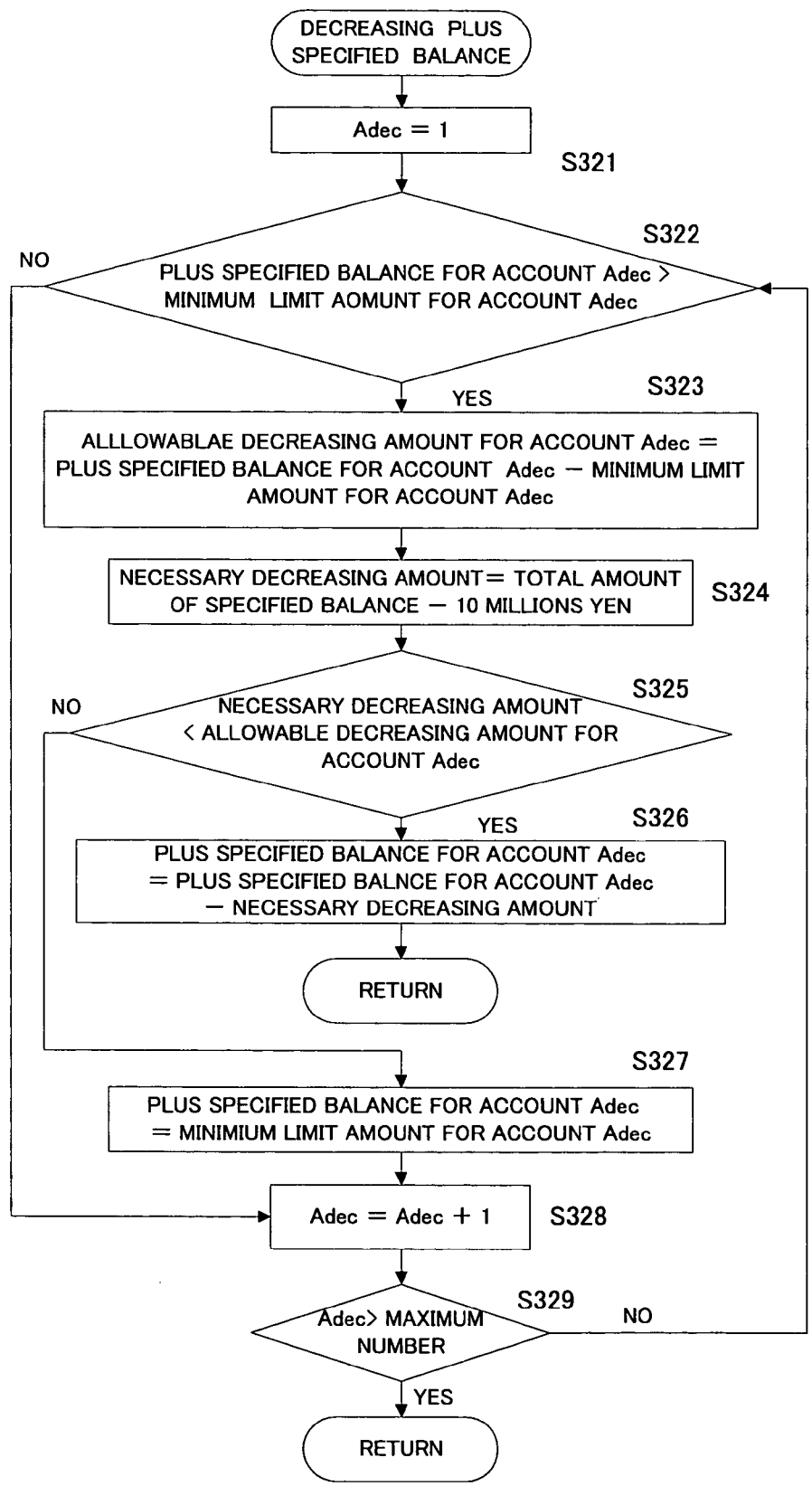

Next, it explains the case where the plus specified balance is decreased by this method. Referring to FIG. 7C, first of all, the system for automatically adjusting deposit balance sets priority level for decreasing amount Adec to "1" in order to decrease the plus specified balance (S321). The system for automatically adjusting deposit balance distinguishes in the next whether the plus specified balance for the deposit account of Adec is more or less than the minimum limit amount referring to the plus specified balance limit amount table in Table 2 (S322). It proceeds to step S323 to decrease the plus specified balance for the deposit account of Adec when the plus specified balance is more than the minimum limit amount. On the other hand, it proceeds to step S328 to move to the deposit account of the following priority level when the plus specified balance is below the minimum limit amount.

When the plus specified balance is more than the minimum limit amount, the system for automatically adjusting deposit balance subtracts the minimum limit amount from the plus specified balance and calculates the allowable decreasing amount (S323). Then the system for automatically adjusting deposit balance subtracts 10,000,000 yen from in total amounts of the plus specified balances and calculates a necessary reduction amount (S324).

The system for automatically adjusting deposit balance distinguishes whether a necessary reducing (decreasing) amount is within the allowable reducing amount or not (S325). The system for automatically adjusting deposit balance subtracts a necessary reducing amount from the plus specified balance and calculates a new plus specified balance in case that the necessary reducing amount is within the allowable reducing amount (S326). In this case, the processing ends, since the plus specified balance has been decreased by the necessity. On the other hand, when the necessary reducing amount exceeds the allowable reducing amount, the system for automatically adjusting deposit balance sets the plus specified balance to the minimum limit amount (S327). In this case, it proceeds to step S328 to move to the deposit account of the following priority level because it has not decreased by necessity, though the plus specified balance is decreased down to possible permissible amount.

When the plus specified balance is bellow the minimum limit amount in step S322 or after decreasing the plus specified balance down to the minimum limit amount in step S327, the system for automatically adjusting deposit balance makes increment to the decrease priority level for decreasing amount Adec (S328).

The system for automatically adjusting deposit balance distinguishes whether priority level for decreasing amount Adec exceeded the maximum number (It is 2 in this example) and ends its process if exceeded and it returns to step S322 if it is not exceeded.

Hereinafter disclosed are the example 1 and example 2 in which the system automatically increases the plus specified balance and also disclosed are the example 3 and 4 in which the system automatically decreases the plus specified balance by the above-mentioned method respectively.

EXAMPLE 1

Table 3 shows the transition of individual specified balance when the plus specified balance can be increased by 500,000 yen due to decreasing of time deposit amounts by 500,000 yen.

TABLE 3

Reduction of 500,000 yen for the time deposit

| Account | Present plus specified balance | Present minus specified balances | After it changed 1 | After it changed 2 |
|---|---|---|---|---|
| Checking account | 5,000,000 | — | 5,000,000 | 5,500,000 |
| Ordinary deposit | 3,000,000 | — | 3,000,000 | 3,000,000 |
| Time deposit | 8,000,000 | — | 7,500,000 | 7,500,000 |
| Loan | — | 6,000,000 | 6,000,000 | 6,000,000 |
| Total | 16,000,000 | 6,000,000 | 9,500,000 | 10,000,000 |

EXAMPLE 2

Table 4 shows the transition of individual specified balance when the loan was increased by 10,000,000 yen and the plus specified balance be allowed to increase by 10,000,000 yen.

TABLE 4

Loan is increased for 10,000,000 yen

| Account | Present plus specified balance | Present minus specified balances | After it changed 1 | After it changed 2 | After it changed 3 |
|---|---|---|---|---|---|
| Checking account | 5,000,000 | — | 5,000,000 | 6,000,000 | 6,000,000 |
| Ordinary deposit | 3,000,000 | — | 3,000,000 | 3,000,000 | 12,000,000 |
| Time deposit | 8,000,000 | — | 8,000,000 | 8,000,000 | 8,000,000 |
| Loan | — | 6,000,000 | 16,000,000 | 16,000,000 | 16,000,000 |
| Total | 16,000,000 | 6,000,000 | 0 | 1,000,000 | 10,000,000 |

EXAMPLE 3

Table 5 shows the transition of individual specified balance in case that the plus specified balance must be decreased by 100,000 yen due to having increased time deposit by 100,000 yen.

(henceforth blank)

TABLE 5

The time deposit is increased for 100,000 yen

| Account type | Present plus specified balance | Present minus specified balances | After it changed 1 | After it changed 2 |
|---|---|---|---|---|
| Checking account | 5,000,000 | — | 5,000,000 | 5,000,000 |
| Ordinary deposit | 3,000,000 | — | 3,000,000 | 2,900,000 |
| Time deposit | 8,000,000 | — | 8,100,000 | 8,100,000 |
| Loan | — | 6,000,000 | 6,000,000 | 6,000,000 |
| Total | 16,000,000 | 6,000,000 | 10,100,000 | 10,100,000 |

EXAMPLE 4

Table 6 shows the transition of individual specified balance in case that the plus specified balance must be decreased by 100,000 yen due to having decreased the loan by 100,000 yen.

TABLE 6

Reduction 100,000 yen in the loan

| Account | Present | After changed 1 | After changed 2 |
|---|---|---|---|
| Checking account | 5,000,000 | 5,000,000 | 5,000,000 |
| Ordinary deposit | 3,000,000 | 3,000,000 | 2,900,000 |
| Time deposit | 8,000,000 | 8,000,000 | 8,000,000 |
| Loan | 6,000,000 | 5,900,000 | 5,900,000 |
| Total | 10,000,000 | 10,100,000 | 10,000,000 |

(2) Method of Setting Amount of Limit Among One to Plural

In the method for setting limited amount between one to one as described above, it is possible that since only one maximum or minimum limit amount of the plus specified balance is set to one deposit account, The plus specified balances for one account reaches the maximum or limit amount without stopping and that the difference between amounts of the plus specified balance for one and the other account becomes too much. In order to avoid such case, the present method sets two or more (plural) maximum or minimum limit amounts for plural plus specified balances for one deposit account.

More concretely, the plus specified balance limit amount table shown in Table 7 is previously prepared, and is stored on hard disk 12.

TABLE 7

Plus specified balance limit amount table

| Account | Priority level for increasing amount $A_{inc}$ | Maximum limit amount of the plus specified balance | Priority level for decreasing amount $A_{dec}$ | Minimum limit amount of plus specified balance |
|---|---|---|---|---|
| Checking account | 1 | 8,000,000 | 4 | 0 |
| Ordinary deposit | 2 | 5,000,000 | 3 | 0 |
| Checking deposit | 3 | 12,000,000 | 2 | 4,000,000 |
| Ordinary deposit | 4 | ∞ | 1 | 1,000,000 |

In the example shown in Table 7, It is set individual two maximum limit amounts (8,000,000 yen and 12,000,000 yen) and different two minimum limit amounts (0 yen and 4,000,000 yen) as a plus specified balance for the checking deposit account. Also two different maximum amounts ((5,000,000 yen and unrestricted) and two different minimum amounts (0 yen and 1,000,000 yen) as a plus specified balance for the ordinary deposit account are set.

The plus specified balance is increased or decreased by this method according to the flow chart of FIGS. 7A and 7B as mentioned above. It is a point to refer to the limit amount table in Table 7 in place of Table 2 which the present method differs from the one described the above.

Therefore, according to this method in order to increase the plus specified balance, the plus specified balance for the checking account increases to 8,000,000 yen followed the plus specified balance for the ordinary deposit account increasing to 5,000,000 yen, then the plus specified balance for the checking account increases again to 12,000,000 yen and finally the plus specified balance for the ordinary deposit account again increases unrestrictedly.

On the other hand, in order to decrease the plus specified balance, the plus specified balance for the ordinary deposit account decreases to 1,000,000 at first, followed by the plus specified balance for the checking account to 4,000,000 yen, then the plus specified balance is decreased again to 0 yen for the ordinary deposit account, and finally the plus specified balance for the checking account decreases again to 0 yen.

Hereinafter disclosed are four examples in total, two for automatically and respectively increasing the plus specified balance and other two for decreasing the plus specified balance by the present method.

EXAMPLE 5

Table 8 shows the transition of individual plus specified balance when the plus specified balance can be increased by 4,000,000 yen due to decreasing in the time deposit balance by 4,000,000 yen.

TABLE 8

| | Reduction in the amount of 4,000,000 yen for the time deposit | | | | |
|---|---|---|---|---|---|
| Account | Present plus specified balance | Present minus specified balance | After it changed 1 | After it changed 2 | After it changed 3 |
| Checking account | 5,000,000 | — | 5,000,000 | 8,000,000 | 8,000,000 |
| Ordinary deposit | 3,000,000 | — | 3,000,000 | 3,000,000 | 4,000,000 |
| Time deposit | 8,000,000 | — | 4,000,000 | 4,000,000 | 4,000,000 |
| Loan | — | 6,000,000 | 6,000,000 | 6,000,000 | 6,000,000 |
| Total | 16,000,000 | 6,000,000 | 6,000,000 | 9,000,000 | 10,000,000 |

EXAMPLE 6

Table 9 shows the transition of individual specified balance in case that the plus specified balance is increased by 5,000,000 yen due to having increased the loan by 5,000,000 yen.

TABLE 9

| | Increasing loan by 5,000,000 yen | | | | |
|---|---|---|---|---|---|
| Account | Present plus specified balance | Present minus specified balance | After it changed 1 | After it changed 2 | After it changed 3 |
| Checking account | 5,000,000 | — | 5,000,000 | 8,000,000 | 8,000,000 |
| Ordinary deposit | 3,000,000 | — | 3,000,000 | 3,000,000 | 5,000,000 |
| Time deposit | 8,000,000 | — | 8,000,000 | 8,000,000 | 8,000,000 |
| Loan | — | 6,000,000 | 11,000,000 | 11,000,000 | 11,000,000 |
| Total | 16,000,000 | 6,000,000 | 5,000,000 | 8,000,000 | 10,000,000 |

EXAMPLE 7

Table 10 shows the transition of individual specified balance in case that the plus specified balance should be reduced by 100,000 yen because that time deposit amount is increased by 100,000 yen.

TABLE 10

| | Increasing of time deposit for 100,000 yen | | | |
|---|---|---|---|---|
| Account | Present plus specified balance | Present minus specified balance | After it changed 1 | After it changed 2 |
| Checking account | 5,000,000 | — | 5,000,000 | 5,000,000 |
| Ordinary deposit | 3,000,000 | — | 3,000,000 | 2,900,000 |
| Time deposit | 8,000,000 | — | 8,100,000 | 8,100,000 |
| Loan | — | 6,000,000 | 6,000,000 | 6,000,000 |
| Total | 16,000,000 | 6,000,000 | 10,100,000 | 10,000,000 |

EXAMPLE 8

Table 11 shows the transition of individual specified balance in case that the plus specified balance must be decreased by 4,000,000 yen due to having decreased the loan by 4,000,000 yen.

TABLE 11

Reduction of loan in the amount of 4,000,000 yen

| Account | Present plus specified balance | Present minus specified balance | After it changed 1 | After it changed 2 | After it changed 3 | After it changed 4 |
|---|---|---|---|---|---|---|
| Checking account | 5,000,000 | — | 5,000,000 | 5,000,000 | 4,000,000 | 4,000,000 |
| Ordinary deposit | 3,000,000 | — | 3,000,000 | 1,000,000 | 1,000,000 | 0 |
| Time deposit | 8,000,000 | — | 8,000,000 | 8,000,000 | 8,000,000 | 8,000,000 |
| Loan | — | 6,000,000 | 2,000,000 | 2,000,000 | 2,000,000 | 2,000,000 |
| Total | 16,000,000 | 6,000,000 | 14,000,000 | 12,000,000 | 11,000,000 | 10,000,000 |

1.2. Necessary Balance Transfer Processing

The deposit is automatically distributed to two or more (plural) banks at 15 o'clock on Friday every week according to the specified balance transfer processing mentioned above. While this function is effective for measures against pay-off, it possibly causes payment stagnation for automatic charging system due to insufficiency of balance in the account. The specified balance transfer processing distributes an extra deposit amount to the account with a low priority level, while the account with higher priority level is collecting a lot of deposits as much as possible. Since the deposit account with high prior level deals with many transactions, the deposit balance is decreased easily. As a result, the balance shortage might occur in the account with a higher priority level even though there is enough balance in other account with lower priority. In that case therefore, it is necessary to retransfer the deposit which was transferred to the account with a low priority level back to the account with a high priority level and return it.

Figure 8:
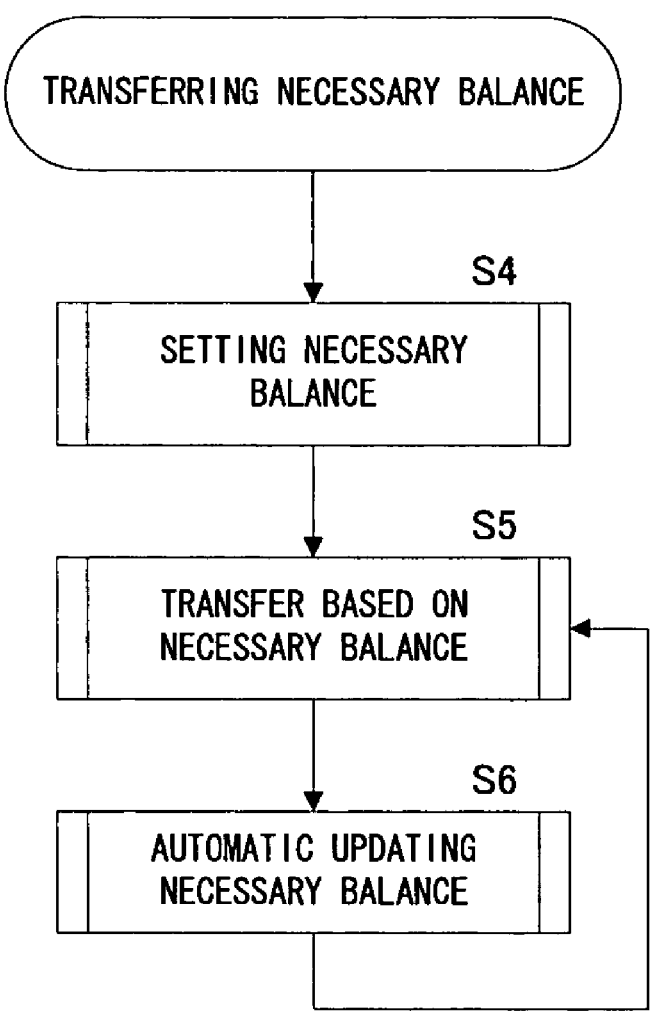
FIG. 8 is a flow chart which shows the necessary balance transfer processing of the system for automatically adjusting deposit balance in the form of the embodiment of this invention.

Referring to FIG. 8, when the system for automatically adjusting deposit balance operates the necessary balance transfer processing, it starts with setting necessary balance (S4) and then transfers money based on the amount of necessary balance (S5) and is followed at the end by updating necessary balance automatically (S6). Hereafter, it explains these steps.

1.2.1. Necessary Balance Setting (S4)

The necessary balance is set for the floating deposit account of the checking and the savings (ordinary deposit) account. First of all, the system for automatically adjusting deposit balance sets a necessary balance of bank X as shown in Table 12 for instance.

TABLE 12

Example of setting necessary balance etc

| Bank | Account | Plus specified balance | Necessary balance | Priority level for designated transfer account Ades | Priority level for transfer source account Asou |
|---|---|---|---|---|---|
| bank X (main bank) | Checking account | ¥5,000,000 | ¥5,000,000 | 1 | 3 |
| | Ordinary deposit | ¥3,000,000 | ¥3,000,000 | 2 | 2 |
| | Time deposit | ¥8,000,000 | — | | |
| | Loan | — | — | | |
| | Total | ¥16,000,000 | — | | |

TABLE 12-continued

Example of setting necessary balance etc

| Bank | Account | Plus specified balance | Necessary balance | Priority level for designated transfer account Ades | Priority level for transfer source account Asou |
|---|---|---|---|---|---|
| Bank Y (sub-bank) | Checking account | ¥0 | ¥0 | | |
| | Ordinary deposit | ¥10,000,000 | ¥0 | 3 | 1 |
| | Time deposit | ¥0 | — | | |
| | Loan | — | — | | |
| | Total | ¥10,000,000 | — | | |

Figure 9:
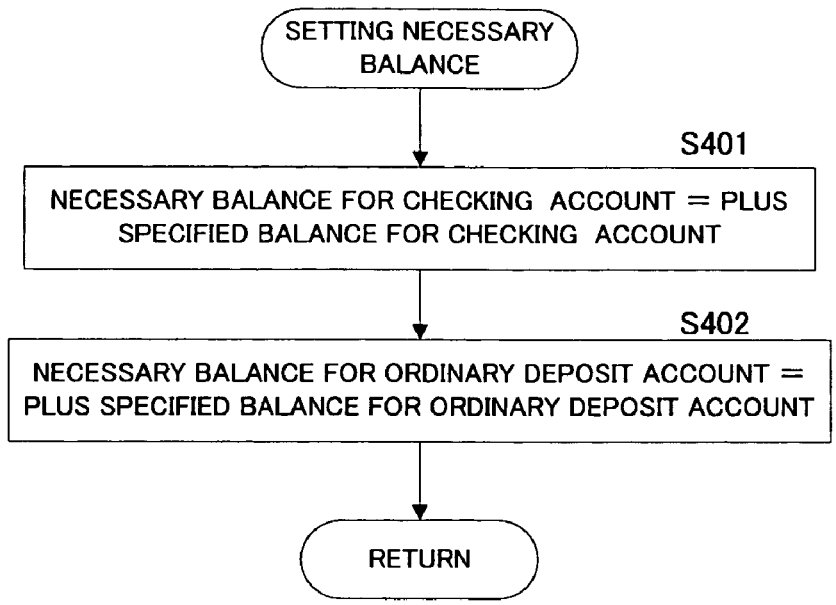
FIG. 9 is a flow chart where the necessary balance setting processing to bank X in FIG. 3 is shown.

Referring to FIG. 9, in more concrete, firstly the system for automatically adjusting deposit balance automatically sets a necessary balance for the checking account to the same amount of the plus specified balance for the checking account (S401). In the example as shown in Table 12, the necessary balance for the checking account is automatically sets to 5,000,000 yen, since the plus specified balance for the checking account is 5,000,000 yen.

Then, the system for automatically adjusting deposit balance automatically sets the necessary balance for the ordinary deposit account to the same amount as the plus specified balance for the ordinary deposit account (S402). In the example shown in Table 12, the plus specified balance for the ordinary deposit account is 3,000,000 yen, therefore a necessary balance for the ordinary deposit account is automatically set to 3,000,000 yen.

The system for automatically adjusting deposit balance continuously sets the necessary balance of bank Y as shown in Table 12 for instance.

Figure 10:
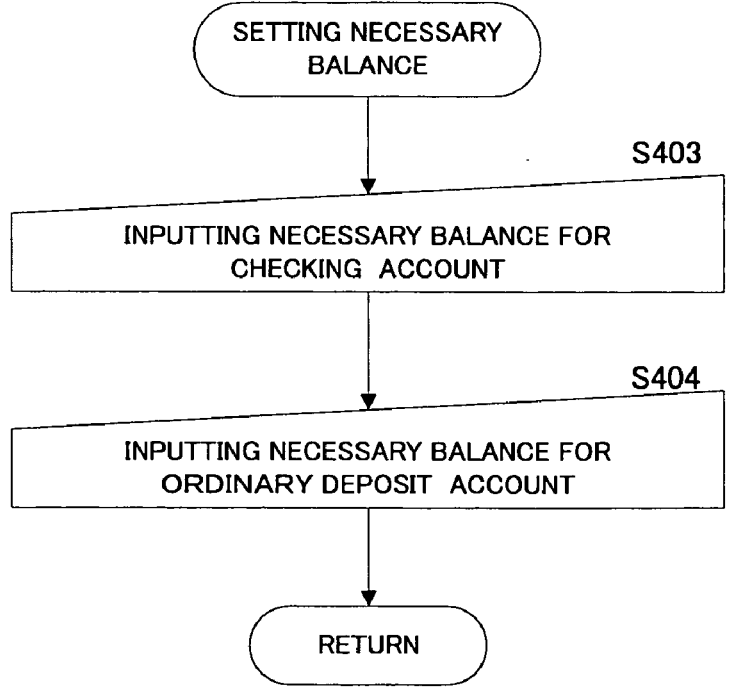
FIG. 10 is a flow chart where the necessary balance setting processing to bank Y in FIG. 8 is shown.

In more detail, referring to FIG. 10, the depositor inputs a preferred necessary balance for the checking account by operating keyboard 14 of PC1 (S403). The example shown in Table 12 illustrates that a necessary balance for the checking account is set to 0 yen.

Continuously the depositor inputs a desired necessary balance for the ordinary deposit account by operating keyboard 14 of PC1 (S404). In the example shown in Table 12, the necessary balance for the ordinary deposit account is set to 0 yen.

1.2.2. Transfer Based on Necessary Balance (S5)

Next, the system for automatically adjusting deposit balance transfers money based on the set necessary balance. Like as the case of transferring operation based on the specified balance, it is also necessary to decide in this case the source account of transfer, the transfer designated account and the amounts of transfer in order to transfer money. For that purpose in this case also, the system uses the priority level Ades for the designated transfer account and the priority level Asou for the transfer source account.

Figure 11A:
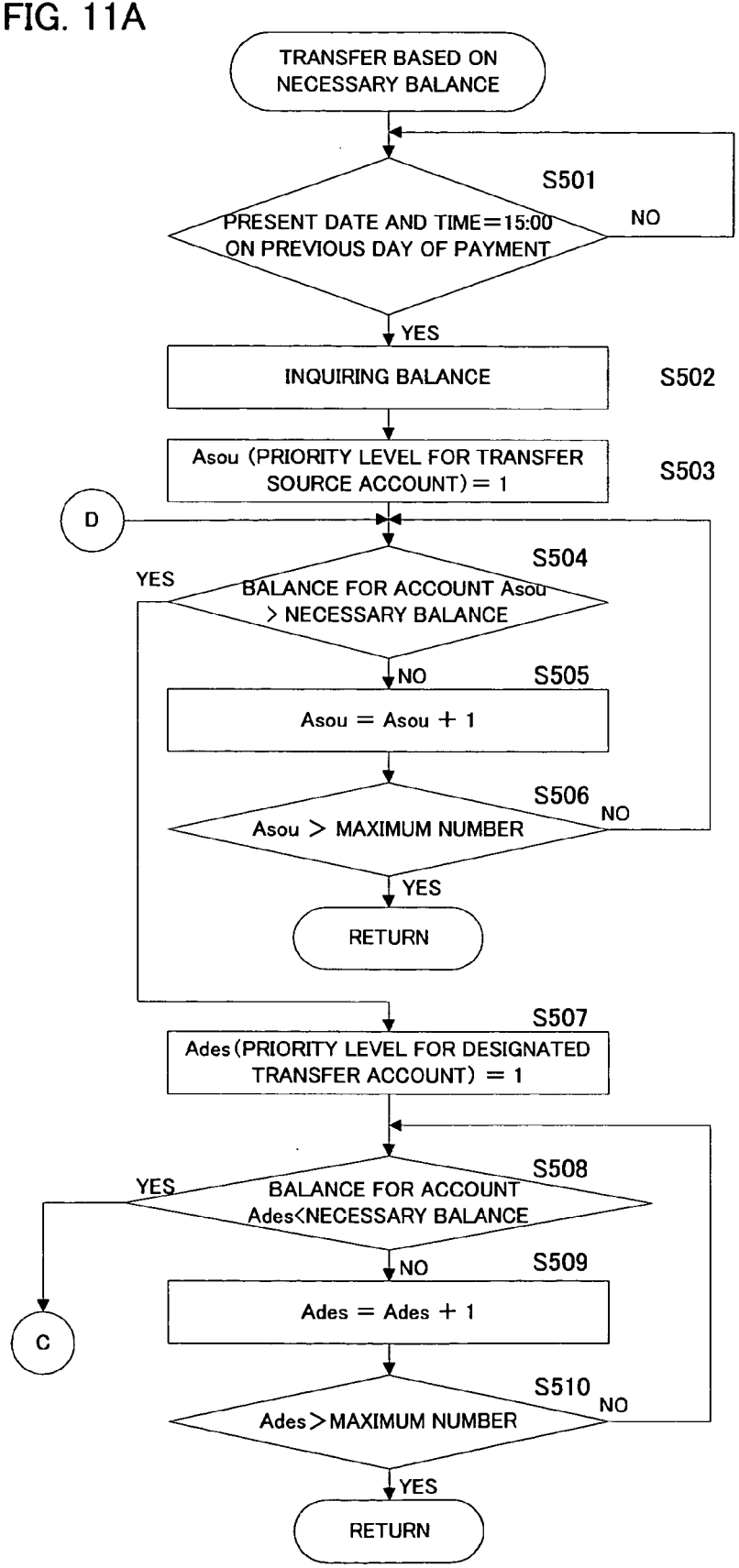
FIGS. 11A and 11B are flow charts where the transfer processing based on a necessary balance in FIG. 8 are shown.
Figure 11B:
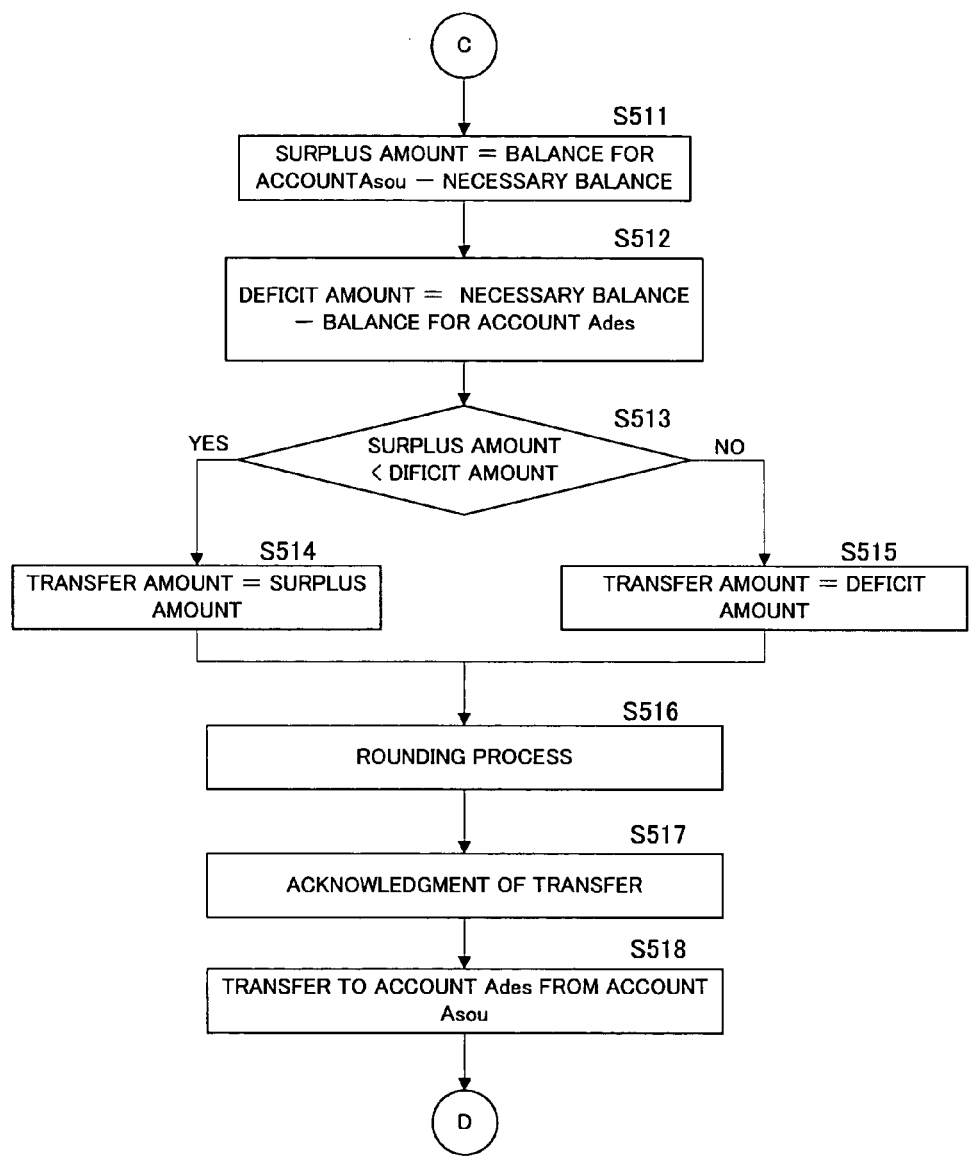

Referring now to FIGS. 11A and 11B, the system for automatically adjusting deposit balance judges whether a present time and date is 15:00 of previous day of certain payment or not (S501). The depositor usually is aware of the payment day and sets such date beforehand.

When it becomes to 15:00 of the day before the payment day, the system for automatically adjusting deposit balance accesses server 3 of bank X and server 4 of bank Y and inquires the balance of each deposit account (S502).

The system for automatically adjusting deposit balance continuously retrieves individual transfer source account for the present balance which exceeds the necessary balance in accordance with the priority level Asou of the transfer source account (S503-S506). Concrete operation is as follows:

First of all, the system for automatically adjusting deposit balance sets the priority level Asou for the transfer source account to "1" (S503).

The system for automatically adjusting deposit balance continuously judges whether the balance of the selected transfer source account exceeds the necessary balance or not (S504). When the result shows exceeding, it advances to S507 to retrieve the designated transfer account.

On the other hand, when the result shows not exceeding, the system for automatically adjusting deposit balance makes the increment of the priority level Asou for the transfer source account (S505).

And, the system for automatically adjusting deposit balance judging whether the priority level Asou for the transfer source account exceeds the maximum number (in the example it is 3) or not (S506), ends transfer processing in case of exceeding and returns to S504 in case of not exceeding.

Next, the system for automatically adjusting deposit balance retrieves the transfer designated account whose present balance is less than the necessary balance according to the priority level Ades for the designated transfer account (S507-S510). Concrete operation is as follows:.

First of all, the system for automatically adjusting deposit balance sets the priority level Ades for the designated transfer account to "1" (S507).

Then the system for automatically adjusting deposit balance judges whether the balance of the selected designated transfer account is less than its plus necessity balance or not (S508). It advances to S511 to decide the amount of transfer money, if it judges less.

On the other hand, if it is not less, the system for automatically adjusting deposit balance adds increment to the priority level Ades for the designated transfer account (S509).

And, the system for automatically adjusting deposit balance judging whether the priority level Ades for the designated transfer account exceeds the maximum number (in the example shown in Table 12, it is 3) or not (S510), ends transfer processing in case of exceeding and returns to S508 in case of not exceeding.

Next, the system for automatically adjusting deposit balance subtracts the necessary balance from the balance of the selected transfer source account and calculates surplus amount (S511).

The system for automatically adjusting deposit balance continuously subtracts the balance of the account from a necessary balance for the selected designated transfer account and calculates deficit amount (S512).

The system for automatically adjusting deposit balance comparing the calculated surplus amount with the deficit amount (S513), determines the surplus amounts as transfer amount when the surplus amount is less than the deficit amount (S514) and determines the deficit amount as transfer amount when it is less than surplus amount (S515). In short, the system for automatically adjusting deposit balance sets the lesser amount of the surplus amount and the deficit amount for transfer amount.

The system for automatically adjusting deposit balance continuously rounds the fraction of the amount of money to be transferred (S516).

Then, the system for automatically adjusting deposit balance displays this amount of money to be transferred on display 13 and requests the approval of the transfer to the depositor (S517). When the depositor approves the transfer, the system for automatically adjusting deposit balance sends the instruction to server 3 or 4 of the bank where a transfer source account is maintained to transfer the decided transfer amount to the designated accounts from the transfer source account. (S518).

Upon completion of the transfer, it returns to S504 and the system repeats the above processing until no deposit accounts exist whose balance exceeds its necessary balance.

As mentioned above, it might not happen to cause payment to stagnate according to the transfer processing based on a necessary balance, since the system inquiring the balance at a prescribed date of the day before the payment day and any deficient money is supplied by transferring from other deposit accounts.

Figure 12:
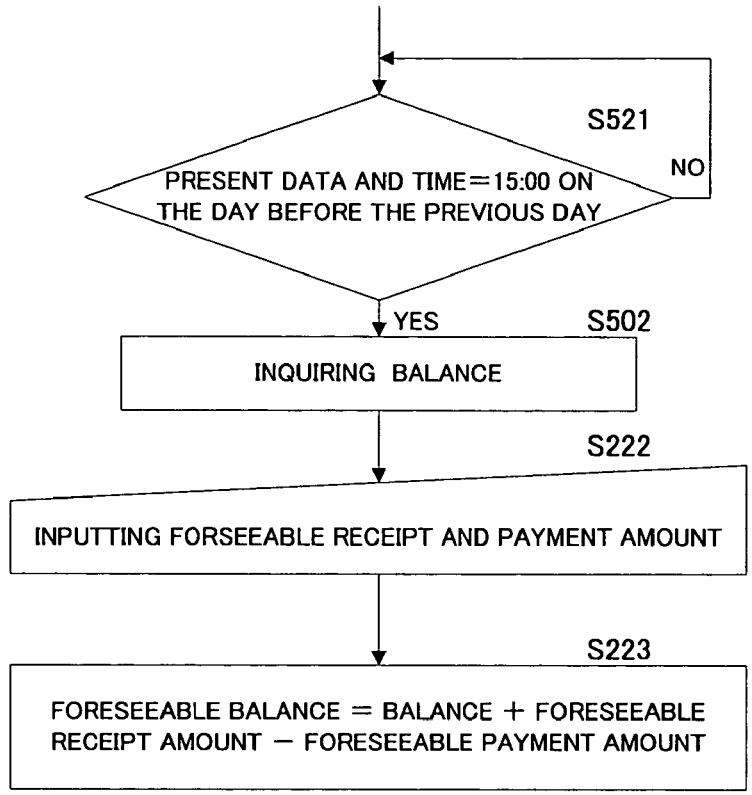
FIG. 12 is a flow chart of the other embodiment of the balance inquiry processing as shown in FIG. 11A.

However, there remains a possibility that all the transfer processing cannot be completed, even though respective balances is inquired on the day before the payment day as is the case described the above relating to the transfer processing based on the specified balance, too. Then, the system may be set to make an inquiry on individual balance at 15:00 of two previous days before the day of payment due as shown in FIG. 12 (S521, S502). In this case, it is desirable to consider possible receipt and payment in these two days. For that purpose, after inquiring individual balance in respective account, the depositor shall input foreseeable receipt and payment amounts (S222) so that the system for automatically adjusting deposit balance may add forecasted receipt amount to the existed balance and or subtract the amount of the foreseeable payment amount from the present balance and, as a result it calculates the forecasted balance (S223).

1.2.3. Automatic Update Processing of Necessary Balance (S6)

Figure 13:
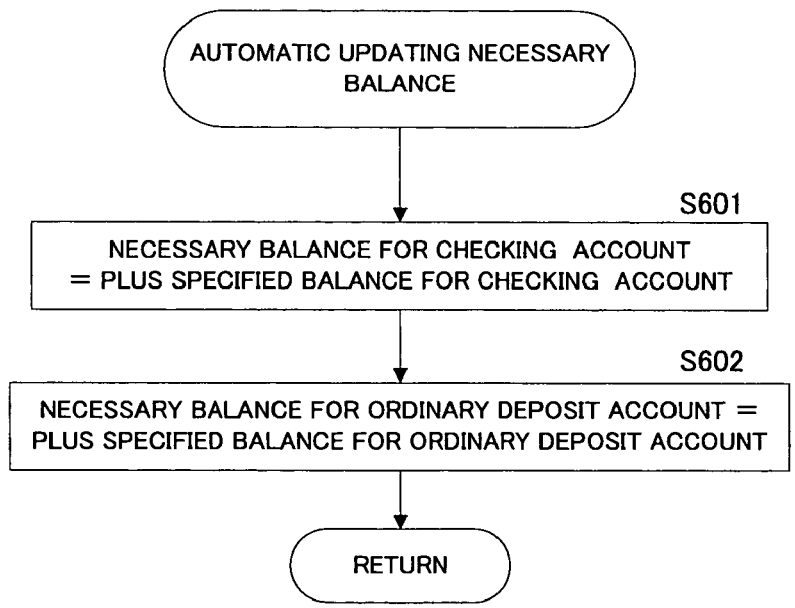
FIG. 13 is a flow chart which shows the necessary balance automatic update processing in FIG. 8.

Now referring to FIG. 13, firstly the system for automatically adjusting deposit balance automatically sets a necessary balance for the checking account to the same amount as the plus specified balance for the checking account (S601). If the plus specified balance for the checking account has changed, a necessary balance for the checking account is automatically set to same amount as new plus specified balance for the checking account.

In succession, the system for automatically adjusting deposit balance automatically sets a necessary balance for the ordinary deposit account to the same amount as the plus specified balance for the ordinary deposit account (S602). If the plus specified balance for the ordinary deposit account has changed, a necessary balance for the ordinary deposit account is automatically set to same amount as a new plus specified balance.

2. Other Embodiment

2.1. Setting and Automatic Updating of Necessary Balance

Figure 14:
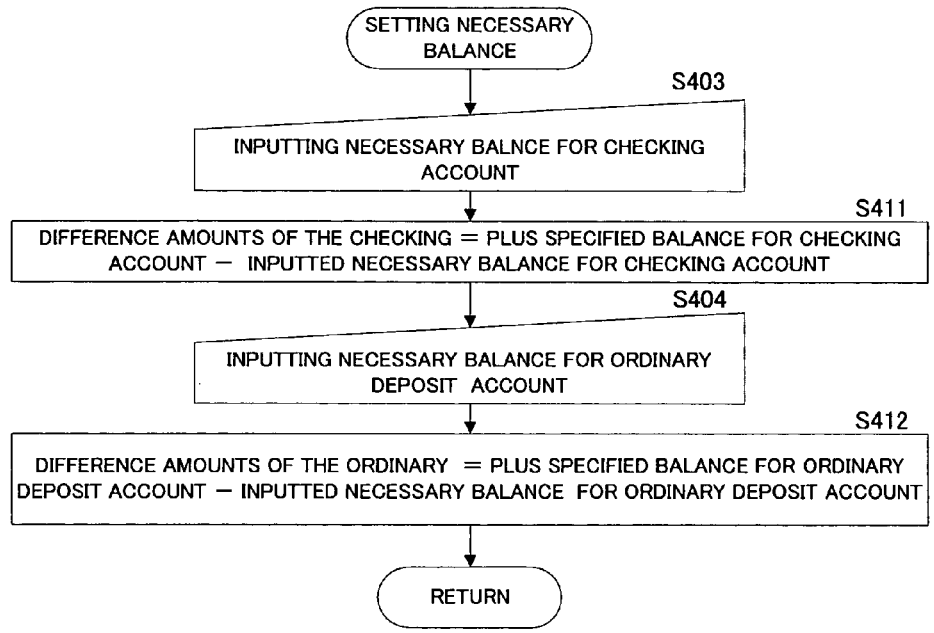
FIG. 14 is a flow chart which shows other embodiment of necessary balance setting processing in FIG. 8.

In the embodiment mentioned above, the necessary balance is set the same amount as the plus specified balance. However the necessary balance may be set to different amount from the plus specified balance. As shown in FIG. 14, in this case, step S411 and S412 is added respectively next to step S403 and S404 which are shown in FIG. 10.

For instance, assuming that the depositor inputs 4,000,000 yen which is lower than 5,000,000 yen of the plus specified balance as a necessary balance for the checking account (S403), the system for automatically adjusting deposit balance subtracts the inputted 4,000,000 yen of a necessary balance for the checking account from 5,000,000 yen of the plus specified balance for the checking account and calculates the difference amounts of 1,000,000 yen of the checking (S411).

When the depositor continuously inputs 2,000,000 yen as a necessary balance for the ordinary deposit account that is less than 3,000,000 yen of the plus specified balance (S404), the system for automatically adjusting deposit balance subtracts the inputted 2,000,000 yen of the necessary balance for the ordinary deposit account from 3,000,000 yen of the plus specified balance for the ordinary deposit account and calculates the difference amounts of 1,000,000 yen of the ordinary (S412).

Figure 15:
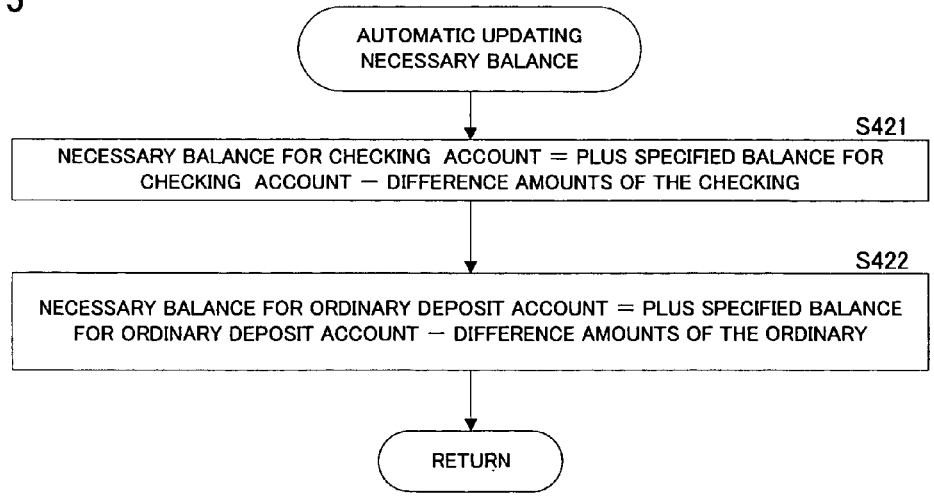
FIG. 15 is a flow chart which shows the necessary balance setting processing in FIG. 8 in the embodiment as shown in FIG. 14.

In this case, a necessary balance is automatically updated as shown in FIG. 15 after it transfers money based on the set necessary balance.

For instance, when the plus specified balance for the checking account increases by 500,000 yen and it becomes 5,500,000 yen in total, the system subtracts the difference amounts of 1,000,000 yen of the checking that is calculated in step S411 as mentioned above from 5,500,000 yen of the plus specified balance for the checking account and calculates 4,500,000 yen which is new necessary balance for the checking account (S421).

Moreover, when the plus specified balance for the ordinary deposit account reduced by 500,000 yen and becomes 2,500,000 yen, the system subtracts the difference amounts of 1,000,000 yen of the ordinary [savings account] that is calculated in step S412 as mentioned above from 2,500,000 yen of the plus specified balance for the ordinary deposit account and calculates 1,500,000 yen which is new necessary balance for the ordinary deposit account (S422).

2.2. Specified Balance Setting by Linkage with Actual Results (No.1)

In the case shown in FIG. 4, the depositor inputs preferable plus specified balance (S103), however it is not easy to decide the plus specified balance based on the experience and intuition. Therefore, it may be automatically set the plus specified balance based on actual results of past payment as described later. Hereafter, it explains as an example of the case where the plus specified balance for the ordinary deposit account among floating deposit accounts is automatically set.

Figure 16A:
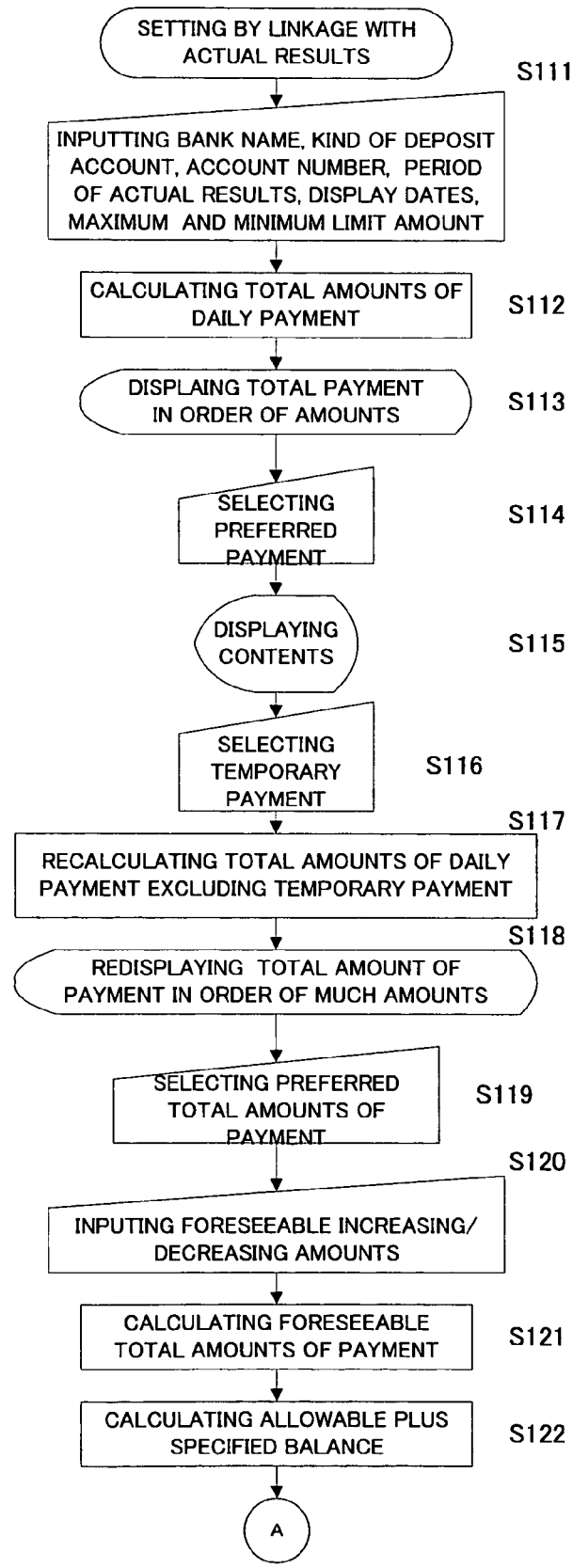
FIGS. 16A and 16B are flow charts which show other embodiment of specified balance setting processing (results synchronization setting processing) in FIG. 3.
Figure 16B:
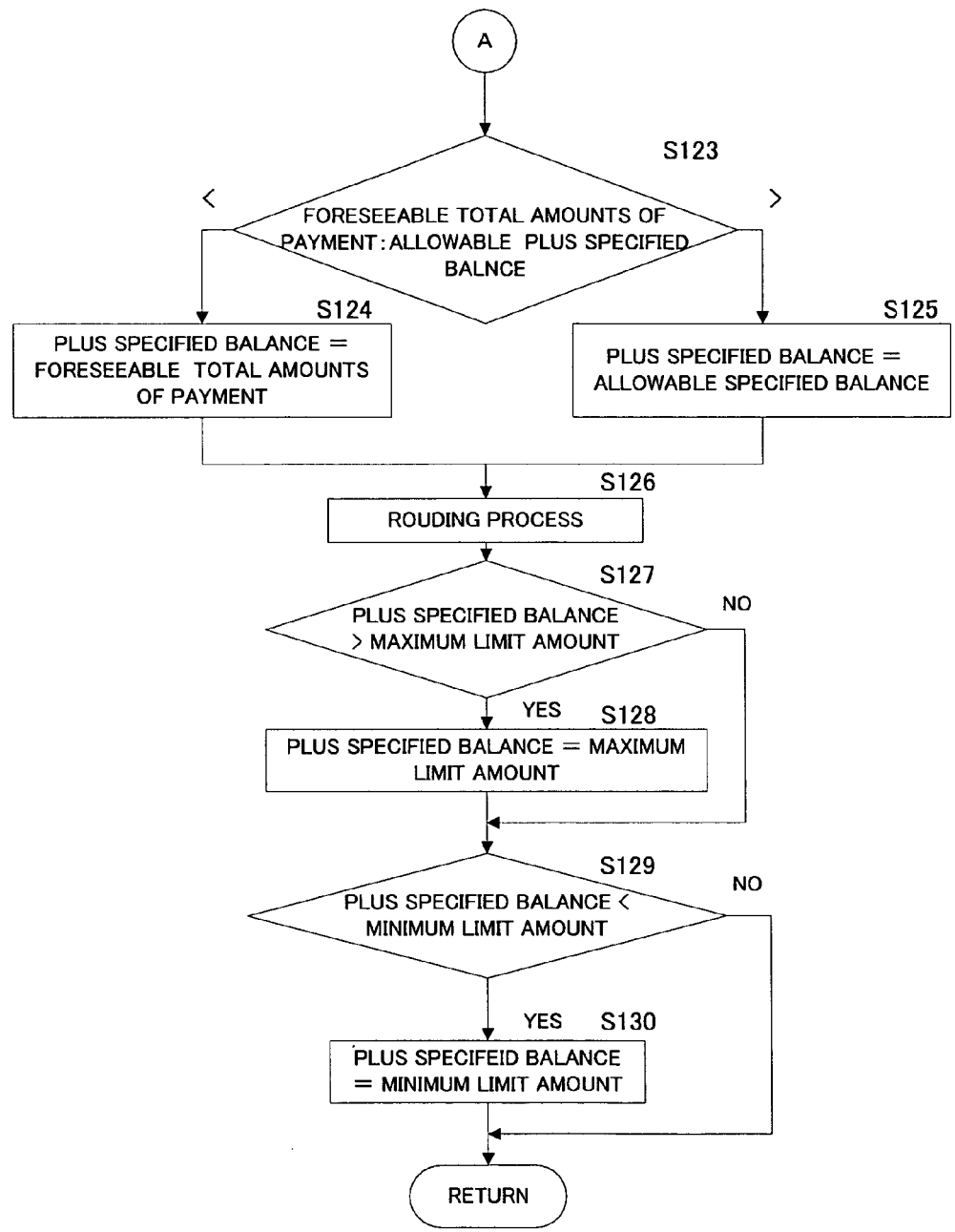

Referring to FIGS. 16A and 16B, at first the depositor inputs a the bank name, the kind of the deposit account, the account number, the referred period of actual results, display days, and the maximum and minimum limit amounts by operating keyboard 14. For example, the depositor inputs "the headquarters of bank X" for the name of the bank, "savings account (ordinary deposit account)" for the kind of deposit account, "1234567" as the account number, "from Apr. 1, 2000 to Mar. 31, 2002" for the referred period of actual results, "5 days" for display days, "6,000,000 yen"as the maximum limit amount and "1,000,000 yen" as the minimum limit amount (S111).

It is preferable to input the latest period even though the depositor may input any preferable referred period of actual results. Moreover, when the first day of the inputted reference period of actual results falls on holiday of the bank, the system for automatically adjusting deposit balance automatically changes the first day to the previous business days. Similarly, when the inputted last day of the display period of actual results falls on the bank's holiday, the system for automatically adjusting deposit balance automatically changes the last day to the first day of next business days.

The system automatically adjusting deposit balance continuously calculates the amounts of daily total payment for each day during the inputted display period of actual results (S112).

In succession the system for automatically adjusting deposit balance displays the order of payment, the payment day, and the total amounts of payment in order of the day which has higher calculated total amounts of payment for the inputted period for display days as shown in FIG. 17 as an example (S113).

The depositor continuously clicks the key for displaying the content corresponding to the preferable payment (S114).

In response to the clicking, the system for automatically adjusting deposit balance displays the breakdown of the selected payment (S115). For instance, when the depositor selects the amount of total payments "6,586,992 yen" in the first place, the system for automatically adjusting deposit balance displays the detail of payment as shown in FIG. 18.

Then the depositor selects the temporary expense which seems to be unusual (S116) and the system displays the symbol implying that the expense is temporary at its right column. The depositor executes similar processing about the total amounts of payment in the second place to the fifth place respectively. Continuously the system for automatically adjusting deposit balance calculates the total amount of daily payment for each day again excluding the selected temporary expense (S117).

In succession the system for automatically adjusting deposit balance displays the order, the payment day, and the total amounts of payment in order of day which has higher calculated total amounts of payment as shown in FIG. 19 as an example (S118). In this example, only the total amount of payment in the first place has been changed because there is no temporary payment in the second to the fifth place.

The depositor continuously selects the preferable payment among five displayed payments (S119). Here, it is assumed that the payment of the first place was selected.

The depositor then inputs the amount of forecasted receipt and payment amounts in the selected payment (S120). For instance, "+100,000 yen" is input when it is foreseeable that monthly charge for the warehouse rent shall be increased by 100,000 yen by the end of July.

The system for automatically adjusting deposit balance adds the inputted increment amount to the selected total amount of payment and/or subtracts the inputted reduction amount from the selected total amount of payment and as a result, calculates the foreseeable total amount of payment (S121). In the above mentioned example, it is calculated 3,086,992 yen (=2,986,992 yen+100,000 yen) as a foreseeable total amount of payment.

Next, the system calculates the allowable plus specified balance by applying the following expression (S122).

The allowable plus specified balance=the limit amount of insurance−(balance of time deposit account−balance of loan)

Here, the allowable plus specified balance is the total amounts of the plus specified balance which can be set to the checking account and the ordinary deposit account. For example, assuming that the limit amount of insurance under deposit insurance system in Japan is 10,000,000 yen, and in case that the balance of the time deposit account is 8,000,000 yen and the balance of loan is 6,000,000 yen, the allowable plus specified balance becomes 8,000,000 yen.

When the plus specified balance for the time deposit is set to the same amount as the balance of the time deposit account and the minus specified balances for the loan is set to the same amount as the balance of the loan, it may use the plus specified balance for the time deposit as a balance of the time deposit account in the above expression and use the minus specified balances for the loan as a balance of the loan.

The system for automatically adjusting deposit balance continuously comparing the foreseeable total amounts of payment with the allowable plus specified balance (S123), the system sets the foreseeable total amounts of payment for the plus specified balance in case that the foreseeable total amounts of payment is lesser (S124) and sets the allowable plus specified balance as the plus specified balance in case the allowable plus specified balance is lesser (S125). In the above-mentioned example, because the foreseeable total amounts of payment 3,086,992 yen is fewer than 8,000,000 yen of the allowable plus specified balance, the plus specified balance is set to 3,086,992 yen.

The system [and method] for automatically adjusting deposit balance continuously processes the fraction of the set allowable plus specified balance (S126). For instance, when less than 100,000 yen is rounded down, the allowable plus specified balance becomes 3,000,000 yen in the example mentioned above.

The allowable plus specified balance is a total sum of the plus specified balances which can be set to the checking account and the ordinary deposit account and therefore, when the allowable plus specified balance is set to the plus specified balance for the ordinary deposit account as it is, it becomes impossible to set the plus specified balance for the checking account. Therefore, the maximum limit amount for the plus specified balance is inputted to the ordinary deposit account in above-mentioned step S111. Moreover, if the total amount of payment in actual results is abnormally few, it is foreseeable that the plus specified balance for the ordinary deposit account shall become insufficient. Therefore, in the above-mentioned step S111, inputted is the minimum limit amount of the settable plus specified balance of the ordinary deposit accounts. As is described later, the system for automatically adjusting deposit balance sets the plus specified balance in between the maximum limit amount and the minimum limit amount.

That is, the system for automatically adjusting deposit balance compares the plus specified balance with inputted maximum limit amount (S127) and sets the maximum limit amount instead of the plus specified balance again when the plus specified balance exceeds the maximum limit amount (S128), and uses the set plus specified balance as it is, when it does not exceed the maximum limit amount.

Next the system for automatically adjusting deposit balance compares the plus specified balance with inputted minimum limit amount (S129), sets the minimum limit amount instead of the plus specified balance when the plus specified balance is lower than the minimum limit amount (S130) and uses the set plus specified balance as it is, when it is not lower than the minimum limit amount.

2.3. Specified Balance Setting by Linkage with Actual Results (No. 2)

Temporary expense is checked beforehand and may be deducted, although temporary expense is checked and deducted after calculating the total amount payment in the above embodiment.

Figure 20:
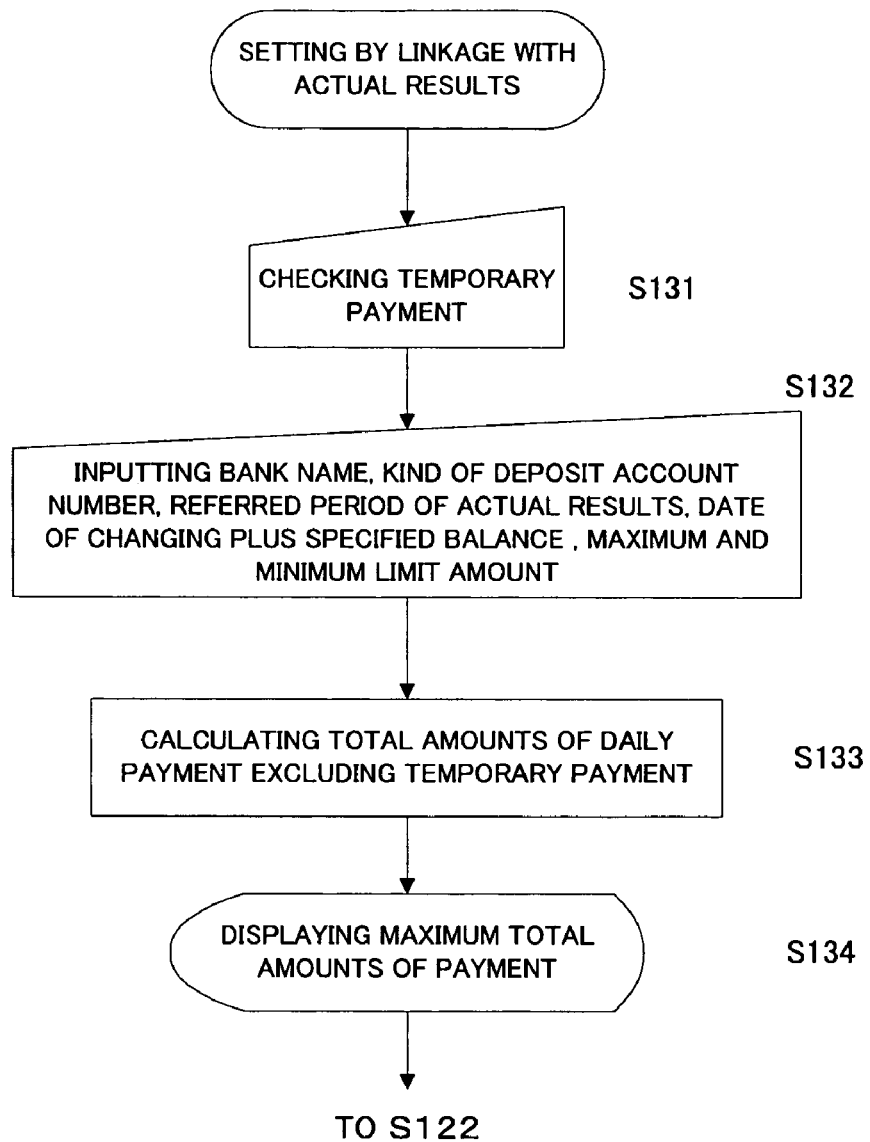
FIG. 20 is a flow chart which shows other embodiment of the results synchronization setting processing as shown in FIGS. 16A and 16B.

In this case, as shown in FIG. 20, the depositor should check temporary expenses at the time of expenditure (S131).

Continuously the depositor inputs bank name, the kind of the deposit account, the account number, the referred period of actual results, the day of the change in the plus specified balance and the maximum and minimum limit amounts (S132). Here in difference to the above embodiment, it is assumed to input "Apr. 1, 2000 to the following 6 months" as the referred period of actual results and to input "the next day of each of 6 months expiration date" as the date for changing the plus specified balance. Then the system for automatically adjusting deposit balance calculates the total amount of payment in each day for the inputted referred period of actual results excluding the pre-checked temporary expense (S133).

In succession, the system for automatically adjusting deposit balance displays the maximum total amount of payment among the calculated total amount payment (S134). In the example the above displayed is the maximum total amount of payment in the amount of 3,086,992 yen that is the maximum amount in the period from Apr. 1, 2000 to Sep. 30, 2000. Here, the system for automatically adjusting deposit balance sets the next referred period of actual results to "Six months from Oct. 1, 2000".

The system for automatically adjusting deposit balance executes the processing of step S122-S130 as shown in FIGS. 16A and 16B like as the embodiment described above. But, here the total amount of payment is used as it is without calculating foreseeable total amount of payment.

2.4. Others

In the embodiment of the above, the plus specified balance is set to the time deposit account and the minus specified balance is set to the loan, but it is not necessary to set these specified balance even though there exists time deposit or loan. It is because of the reason that the plus specified balance is set the same amount as balance for the time deposit and the minus specified balance is set as the same amount as loan. When the plus specified balance is not set for the time deposit account and the minus specified balance is not set for loan for the same account, it is enough to set the plus specified balance for the checking and savings (ordinary deposit) accounts so that the amounts which are canceled out the amount of loan with the total amount of balance for the plus specified balance for the checking and saving accounts and balance for time deposit, may become equal to the [maximum] insurance limit amount. Also, when the plus specified balance for the time deposit is set, while the minus specified balance for the loan is not set, it is enough to set the plus specified balance for the checking and saving accounts so that the amounts which are canceled out the amount of loan with the total amount of the plus specified balance for the checking and saving accounts and the plus specified balance for the time deposit, may become equal to the limit amount covered by the insurance.

Moreover, when the plus specified balance for the time deposit is not set, while the minus specified balance for the loan is set, it is enough to set the plus specified balance for the checking and saving account so that the amounts which are canceled out the minus specified balance for the loan with the total amount of the plus specified balance for checking and saving accounts and the balance for the time deposit account, may be equal to the limit amount covered by the insurance.

And the specified balance transfer processing and necessary balance transfer processing can be executed independently, although both processing are executed in combination in the above embodiment. Moreover, the present invention are applicable for three accounts or more, although two accounts, checking account and the savings account are used as a floating deposit accounts in the above embodiment. Moreover, the balance need not be exactly the same number to the maximum insurance limit amount, even though in the above-mentioned embodiment the specified balance is set so that the balance shall not exceed the insurance limit amount 10,000,000 yen under the deposit insurance system.

That is, it may be set in the amount of 12,000,000 yen or 8,000,000 yen which differs from preferred amount from the insurance limit amount. Moreover, it may be rounded off the fraction of calculated transfer amount in tead of rounding up or down fraction as in the embodiment of the above. In short, it is enough to round the fraction of the calculated amount of money.

Moreover, although the program for automatically adjusting deposit balance is installed in depositor's PC in above mentioned embodiment, it may be installed in the server of the bank. Therefore, it is also possible that the single bank alone can execute this invention. Moreover, the program for automatically adjusting deposit balance may be installed and distributed in two or more computers. Moreover, the interrelated computers may be connected through any kind of telecommunication line, though the computers are connected mutually through the internet in the embodiment described the above. Moreover, two banks are illustrated in the above embodiment, this invention can be applied also among three banks or more.

Explained the above are embodiments of the present invention and those embodiments are merely examples for embodying the present invention. Hence the present invention shall not be restricted to those embodiments and is applicable to another embodiment with proper modifications without diverting its inventive concept.

The invention claimed is:

1. A system for automatically adjusting deposit balance which automatically transfers money between a plurality of floating deposit accounts established in one or more financial institutions for a depositor, the system for automatically adjusting deposit balance comprising:
    specified balance setting means for setting plus specified balance for said floating deposit accounts,
    means for calculating an excess amount by subtracting the plus specified balance for one floating deposit account from the balance of the one floating deposit account,
    means for calculating an allowable amount by subtracting the balance of another floating deposit account from the plus specified balance for the other floating deposit account,
    means for comparing said excess amount with said allowable amount,
    transfer means for transferring one of lesser amount of said excess and allowable amounts from the one floating deposit account to the other floating deposit account, and
    automatic specified balance updating means for increasing or decreasing said plus specified balance in response to fluctuation of a balance of a non-floating deposit account established for said depositor and/or fluctuation of a balance of debt which can be offset with an amount of insurance deposit that is the subject of a deposit insurance system.

2. The system for automatically adjusting deposit balance as described in claim 1, further comprising:
    balance inquiring means for inquiring the balance of said floating deposit accounts at predetermined time and date.

3. The system for automatically adjusting deposit balance as described in claim 2, further comprising:
    means for setting foreseeable receipt amount or foreseeable payment amount, and
    means for adding said set foreseeable receipt amount to the balance for said inquired floating deposit account or for subtracting said set foreseeable payment amount from the balance for said inquired floating deposit account.

4. The system for automatically adjusting deposit balance as described in claim 1, the system for automatically adjusting deposit balance is characterized in that said floating deposit accounts include first and second floating deposit accounts and
    said specified balance setting means set a first plus specified balance for the first floating deposit account and a second plus specified balance for the second floating deposit account.

5. The system for automatically adjusting deposit balance as described in claim 4, wherein said specified balance setting means sets said first and second plus specified balance according to an insurance limit amount in the deposit insurance system.

6. The system for automatically adjusting deposit balance as described in claim 5, wherein said specified balance setting means includes:
    means for setting said first plus specified balance, and
    means for setting said second plus specified balance by subtracting from the insurance limit amount under the deposit insurance system or the amount with predetermined difference from the insurance limit amount, a total sum of said set first plus specified balance and the balance of insurance deposit that is the subject of insurance under the deposit insurance system excluding deposit amounts in the first and second floating deposit accounts.

7. The system for automatically adjusting deposit balance as described in claim 5, wherein said specified balance setting means includes:
    means for setting said first plus specified balance, and
    means for setting said second plus specified balance by subtracting from a total sum of insurance limit amount under the deposit insurance system and the balance of debt which can be offset with an insurance deposit that is the subject of insurance under the deposit insurance system or the amount with predetermined difference from the total sum, the total sum of said inputted first plus specified balance and the balance of insurance deposit excluding deposit amounts in said first and second floating deposit account.

8. The system for automatically adjusting deposit balance as described in claim 4, wherein a non-floating deposit account is established in said financial institution for the depositor, and said specified balance setting means set a third plus specified balance for the non-floating deposit account.

9. The system for automatically adjusting deposit balance as described in claim 8, wherein said specified balance setting means sets the third plus specified balance as the same amount of the balance for the non-floating deposit account.

10. The system for automatically adjusting deposit balance as described in claim 9, wherein said specified balance setting means includes:
    means for setting said first plus specified balance, and means for setting said second plus specified balance by subtracting from the insurance limit amount under the deposit insurance system or the amount with predetermined difference from the insurance limit amount, the total sum of said set first plus specified balance and the third plus specified balance.

11. The system for automatically adjusting deposit balance as described in claim 8, wherein said specified balance setting means sets a minus specified balance to the debt which can be offset with the insurance deposit that is the subject of the deposit insurance system.

12. The system for automatically adjusting deposit balance as described in claim 11, wherein said specified balance setting means sets the minus specified balance to the same amount of said debt.

13. the system for automatically adjusting deposit balance as described in claim 12, further comprising:
   means for setting said first plus specified balance, and
   means for setting said second plus specified balance by subtracting from the total sum of insurance limit amount under the deposit insurance system and said minus specified balance, or the amount with predetermined difference from that total sum amount, the total sum of said set first plus specified balance and said set third plus specified balance.

14. The system for automatically adjusting deposit balance as described in claim 1, wherein said specified balance setting means sets a plus specification balance based on past payment results in said floating deposit accounts.

15. The system for automatically adjusting deposit balance as described in claim 14, wherein said specified balance setting means includes:
   summing means for calculating daily total amounts of payment based on said payment result, and
   means for setting said plus specified balance based on a maximum or next following total sum of payment amounts among said calculated payment amount.

16. The system for automatically adjusting deposit balance as described in claim 15, wherein said specified balance setting means further includes means for excluding temporary expenses out of said payment result, and that said summing means calculates said total payment amounts based on the payment result to be excluded said temporary expenses.

17. The system for automatically adjusting deposit balance as described in claim 4, wherein said automatic specific balance updating means includes:
   a table in which said first and second floating deposit accounts are respectively provided with priority level, a maximum limit amount and a minimum limit amount,
   means for selecting said first or second floating deposit account according to the priority level in the table,
   means for comparing said first or second plus specified balance for said selected floating deposit account with said maximum limit amount provided for said selected floating deposit account,
   means for increasing said first or second plus specified balance for said selected floating deposit account, when said first or second plus specified balance for said selected floating deposit account is less than the maximum limit amount provided for said selected floating deposit account,
   means for comparing the first or second plus specified balance for said selected floating deposit account with the minimum limit amount provided for said selected floating deposit account, and
   means for decreasing the first or second plus specified balance for said selected floating deposit account when said first or second plus specified balance for said selected floating deposit account is more than the minimum limit amount provided for said selected floating deposit account.

18. The system for automatically adjusting deposit balance as described in claim 17, wherein, in said table, the first and second floating deposit account is respectively and repeatedly provided with priority level, the maximum limit amount and the minimum limit amount.

19. The system for automatically adjusting deposit balance as described in claim 1, further comprising:
   necessary balance setting means for setting necessary balance for said floating deposit accounts,
   means for comparing the balance of the one floating deposit account with the necessary balance for the one floating deposit account,
   retransfer means for transferring money back to the one floating deposit account from the other floating deposit account when the balance of the one floating deposit account is less than the necessary balance for the one floating deposit account,
   means for calculating a deficit amount by subtracting the necessary balance for the one floating deposit account from the balance of the one floating deposit account,
   means for calculating a surplus amount by subtracting the necessary balance for the other floating deposit account from the balance of the other floating deposit account,
   means for comparing said deficit amount with said surplus amount, and
   means for setting the amount that is lesser of said deficit and surplus amounts for a transfer amount to be transferred by said retransfer means.

20. The system for automatically adjusting deposit balance as described in claim 19, wherein said necessary balance setting means sets the necessary balance to the same amount as said plus specified balance.

21. A computer implemented method of automatically adjusting deposit balance which automatically transfers money between a plurality of floating deposit accounts established in one or more financial institutions for a depositor, the method comprising:
   specified balance setting step of electrically setting plus specified balance for said floating deposit accounts,
   step of electrically calculating an excess amount by subtracting the plus specified balance for one floating deposit account from the balance of the one floating deposit account,
   step of electrically calculating an allowable amount by subtracting the balance of the other floating deposit account from the plus specified balance for the other floating deposit account,
   step of electrically comparing said excess amount with said allowable amount,
   transfer step of electrically transferring one of lesser amount of said excess and allowable amounts from the one floating deposit account to another floating deposit account, and
   automatically specified balance updating step of increasing or decreasing said plus specified balance in response to fluctuation of a balance of a non-floating deposit account established for said depositor and/or fluctuation of a balance of debt which can be offset with an amount of insurance deposit that is the subject of a deposit insurance system.

22. The method of automatically adjusting deposit balance as described in claim 21, further comprising balance inquiring step of inquiring the balance for said floating deposit accounts at predetermined time and date.

23. The method of automatically adjusting deposit balance as described in claim 22, further comprising:
   step of setting foreseeable receipt amount or foreseeable payment amount, and
   step of adding said set foreseeable receipt amount to the balance of said inquired floating deposit account or for subtracting said set foreseeable payment amount from the balance of said inquired floating deposit account.

24. The method of automatically adjusting deposit balance as described in claim 21, the method of automatically adjusting deposit balance is characterized in that said floating deposit accounts include first and second floating deposit accounts and said specified balance setting step sets a first plus specified balance for the first floating deposit account and a second plus specified balance for the second floating deposit account.

25. The method of automatically adjusting deposit balance as described in claim 24, wherein said specified balance setting step sets said first and second plus specified balance according to an insurance limit amount under the deposit insurance system.

26. The method of automatically adjusting deposit balance as described in claim 25, wherein said specified balance setting step includes:
   step of setting said first plus specified balance, and
   step of setting said second plus specified balance by subtracting from the insurance limit amount under the deposit insurance system or the amount with predetermined difference from an insurance limit amount, a total sum of said set first plus specified balance and the balance of insurance deposit that is the subject of insurance under the deposit insurance system excluding deposit amounts in first and second floating deposit accounts.

27. The method of automatically adjusting deposit balance as described in claim 25, wherein said specified balance setting step includes:
   step of setting said first plus specified balance, and
   step of setting said second plus specified balance by subtracting from a total sum of insurance limit amount under the deposit insurance system and the balance of debt which can be offset with an insurance deposit that is the subject of insurance under the deposit insurance system or the amount with predetermined difference from the total sum, the total sum of said inputted first plus specified balance and the balance of insurance deposit excluding deposit amounts in said first and second floating deposit account.

28. The method of automatically adjusting deposit balance as described in claim 24, wherein a non-floating deposit account is established in said financial institution for said depositor, and said specified balance setting step sets a third plus specified balance for said non-floating deposit account.

29. The method of automatically adjusting deposit balance as described in claim 28, wherein said specified balance setting step sets the third plus specified balance as the same amount of the balance for the non floating deposit account.

30. The method of automatically adjusting deposit balance as described in claim 29, wherein said specified balance setting step includes:
   step of setting said first plus specified balance, and
   step of setting said second plus specified balance by subtracting from the insurance limit amount under the deposit insurance system or the amount with predetermined difference from insurance limit amount, the total sum of said set first plus specified balance and a third plus specified balance.

31. The method of automatically adjusting deposit balance as described in claim 28, wherein said specified balance setting step sets a minus specified balance to the debt which can be offset with the insurance deposit that is the subject of the deposit insurance system.

32. The method of automatically adjusting deposit balance as described in claim 31, wherein said specified balance setting step sets the minus specified balance to the same amount of said debt.

33. The method of automatically adjusting deposit balance as described in claim 32, further comprising:
   step of setting said first plus specified balance, and
   step of setting said second plus specified balance by subtracting from a total sum of insurance limit amount under the deposit insurance system and said minus specified balance, or the amount with predetermined difference from that total sum amount, the total sum of said set first plus specified balance and the third plus specified balance.

34. The method of automatically adjusting deposit balance as described in claim 21, wherein said specified balance setting step sets said plus specified balance based on past payment results in said floating deposit accounts.

35. The method of automatically adjusting deposit balance as described in claim 34, wherein said specified balance setting step includes:
   summing step of calculating daily total amounts of payment based on said payment result, and
   step of setting said plus specified balance based on a maximum or next following total sum of payment amounts among said calculated payment amount.

36. The method of automatically adjusting deposit balance as described in claim 35, wherein said specified balance setting step further includes step of excluding temporary expenses out of said payment result, and that said summing step calculates said total payment amount based on the payment result to be excluded said temporary expenses.

37. The method of automatically adjusting deposit balance as described in claim 24, wherein said specified balance updating step includes:
   step of selecting said first or second floating deposit account according to a priority level in a table in which said first and second floating deposit accounts are respectively provided with the priority level, a maximum limit amount and a minimum limit amount,
   step of comparing said first or second plus specified balance for floating deposit account with said maximum limit amount provided for said selected floating deposit account,
   step of increasing said first or second plus specified balance for said selected floating deposit account, when said first or second plus specified balance for said selected floating deposit account is less than the maximum limit amount provided for said selected floating deposit,
   step of comparing the first or second plus specified balance for said selected floating deposit account with the minimum limit amount provided for said selected floating deposit account, and
   step of decreasing the first or second plus specified balance for said selected floating deposit account when said first or second plus specified balance for said selected floating deposit account is more than the minimum limit amount provided for said selected floating deposit account.

38. The method of automatically adjusting deposit balance as described in claim 37, wherein, in said table, the first and second floating deposit account is respectively and repeatedly provided with priority level, a maximum limit amount and a minimum limit amount.

39. The method of automatically adjusting deposit balance as described in claim 21, further comprising:
- necessary balance setting step of setting necessary balance for said floating deposit accounts,
- step of comparing the balance of the one floating deposit account with the necessary balance for the one floating deposit account,
- retransfer step of transferring money back to the one floating deposit account from the other floating deposit account when the balance of the one floating deposit account is less than the necessary balance for the one floating deposit account,
- step of calculating a deficit amount by subtracting the necessary balance for the one floating deposit account from the balance of the one floating deposit account,
- step of calculating a surplus amount by subtracting the necessary balance for the other floating deposit account from the balance of the other floating deposit account,
- step of comparing said deficit amount with said surplus amount, and
- step of setting the amount that is lesser of said deficit and surplus amounts for a transfer amount to be transferred by said retransfer step.

40. The method of automatically adjusting deposit balance as described in claim 39, wherein said necessary balance setting step sets said necessary balance to the same amount as said plus specified balance.

41. A computer-usable medium having computer readable instructions stored thereon for execution by a processor to perform a method for automatically adjusting deposit balance which automatically transfers money between floating deposit accounts established in one or more financial institutions for a depositor, wherein the instructions comprise:
- specified balance setting step of setting plus specified balance for said floating deposit accounts,
- step of calculating an excess amount by subtracting the plus specified balance for one floating deposit account from the balance of one floating deposit account,
- step of calculating an allowable amount by subtracting the balance of the one floating deposit account from the plus specified balance for another floating deposit account,
- step of comparing said excess amount with said allowable amount,
- transfer step of transferring one of lesser amount of said excess and allowable amounts from the one floating deposit account to the other floating deposit account, and
- automatic specified balance updating step of increasing or decreasing said plus specified balance in response to fluctuation of the balance of a non-floating deposit account established for said depositor and/or fluctuation of a balance of debt which can be offset with an amount of insurance deposit that is the subject of a deposit insurance system.

42. The computer-usable medium of claim 41, wherein the instructions further comprise providing balance inquiring step of inquiring the balance for said floating deposit accounts at predetermined time and date.

43. The computer-usable medium of claim 42, wherein the instructions further comprise:
- step of setting foreseeable receipt amount or foreseeable payment amount, and
- step of adding said set foreseeable receipt amount to the balance of said inquired floating deposit account or of subtracting said set foreseeable payment amount from the balance of said inquired floating deposit account.

44. The computer-usable medium of claim 41, wherein said floating deposit accounts include first and second floating deposit accounts and said specified balance setting step sets a first plus specified balance for the first floating deposit account and a second plus specified balance for a second floating deposit account.

45. The computer-usable medium of claim 44, wherein said specified balance setting step sets said first and second plus specified balance accordance to an insurance limit amount under the deposit insurance system.

46. The computer-usable medium of claim 45, wherein said specified balance setting step includes:
- step of setting said first plus specified balance, and
- step of setting said second plus specified balance by subtracting from the insurance limit amount under the deposit insurance system or the amount with predetermined difference from an insurance limit amount, a total sum of said set first plus specified balance and the balance of insurance deposit that is the subject of insurance under the deposit insurance system excluding deposit amounts in the first and second floating deposit accounts.

47. The computer-usable medium of claim 45, wherein said specified balance setting step includes:
- step of setting said first plus specified balance, and
- step of setting said second plus specified balance by subtracting from a total sum of insurance limit amount in the deposit insurance system and the balance of debt which can be offset with an insurance deposit that is the subject of insurance under the deposit insurance system or the amount with predetermined difference from the total sum, the total sum of said inputted first plus specified amount and the balance of insurance deposit excluding deposit amounts in said first and second floating deposit account.

48. The computer-usable medium of claim 44, wherein a non-floating deposit account is established in the financial institution for said depositor and that the specified balance setting step sets a third plus specified balance for said non floating deposit account.

49. The computer-usable medium of claim 48, wherein said specified balance setting step sets the third plus specified balance as the same amount of the balance for the non floating deposit account.

50. The computer-usable medium of claim 49, wherein said specified balance setting step includes:
- step of setting said first plus specified balance, and
- step of setting said second plus specified balance by subtracting from the insurance limit amount under the deposit insurance system or the amount with predetermined difference from insurance limit amount, the total sum of said set first plus specified balance and the third plus specified balance.

51. The computer-usable medium of claim 48, wherein said specified balance setting step sets a minus specified balance to the debt which can be offset with the insurance deposit that is the subject of the deposit insurance system.

52. The computer-usable medium of claim 51, wherein said specified balance setting step sets the minus specified balance to the same amount of said debt.

53. The computer-usable medium of claim 52, the instructions further comprising:
- step of setting said first plus specified balance, and step of setting said second plus specified balance by subtracting from a total sum of insurance limit amount under the deposit insurance system and said minus specified balance, or the amount with predetermined difference from that total sum amount, the total sum of said set first plus specified balance and the third plus specified balance.

54. The computer-usable medium of claim 41, wherein said specified balance setting step sets said plus specified balance based on past payment results in said floating deposit accounts.

55. The computer-usable medium of claim 54, wherein said specified balance setting step includes:
   summing step of calculating daily total amounts of payment based on said payment result, and
   step of setting said plus specified balance based on a maximum or next following total sum of payment amounts among said calculated payment amount.

56. The computer-usable medium of claim 55, wherein said specified balance setting step further includes:
   step of excluding temporary expenses out of said payment result, and that said summing step calculates said total payment amount based on the payment result to be excluded said temporary expenses.

57. The computer-usable medium of claim 44, wherein said specified balance automatically updating step includes:
   step of selecting said first or second floating deposit account according to a priority level in a table in which said first and second floating deposit accounts are respectively provided with the priority level, a maximum limit amount and a minimum limit amount,
   step of comparing said first or second plus specified balance for floating deposit account with said maximum limit amount provided for said selected floating deposit account,
   step of increasing said first or second plus specified balance for said selected floating deposit account, when said first or second plus specified balance for said selected floating deposit account is less than the maximum limit amount provided for said selected floating deposit,
   step of comparing the first or second plus specified balance for said selected floating deposit account with the minimum limit amount provided for said selected floating deposit account, and
   step of decreasing the first or second plus specified balance for said selected floating deposit account when said first or second plus specified balance for said selected floating deposit account is more than the minimum limit amount provided for said selected floating deposit account.

58. The computer-usable medium of claim 57, wherein said first and second floating deposit account is respectively repeatedly provided with said priority level, the maximum limit amount and the minimum limit amount in said table.

59. The computer-usable medium of claim 41, further including:
   necessary balance setting step of setting necessary balance for said floating deposit accounts,
   step of comparing the balance of the one floating deposit account with the necessary balance for the one floating deposit account,
   retransfer step of transferring money back to the one floating deposit account from the other floating deposit account when the balance of the one floating deposit account is less than the necessary balance for the one floating deposit account,
   step of calculating a deficit amount by subtracting the necessary balance for the one floating deposit account from the balance of the floating deposit account,
   step of calculating a surplus amount by subtracting the necessary balance for the other floating deposit balance from the balance of the other floating deposit account,
   step of comparing said deficit amount with said surplus amount, and
   step of setting the amount that is lesser of said deficit and surplus amounts for a transfer amount to be transferred by said retransfer step.

60. The computer-usable medium of claim 59, wherein said necessary balance setting step sets said necessary balance as the same amount as said plus specified balance.

* * * * *